United States Patent
Kouyama et al.

(10) Patent No.: US 11,796,904 B2
(45) Date of Patent: Oct. 24, 2023

(54) PHASE MODULATOR, LIGHTING SYSTEM, AND PROJECTOR

(71) Applicants: SONY CORPORATION, Tokyo (JP); SONY SEMICONDUCTOR SOLUTIONS CORPORATION, Kanagawa (JP)

(72) Inventors: Yoshiaki Kouyama, Kanagawa (JP); Osamu Akimoto, Tokyo (JP); Takahiro Mochizuki, Kanagawa (JP); Masa Tanaka, Kanagawa (JP)

(73) Assignees: SONY CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 86 days.

(21) Appl. No.: 16/634,590

(22) PCT Filed: Jul. 24, 2018

(86) PCT No.: PCT/JP2018/027680
§ 371 (c)(1),
(2) Date: Jan. 28, 2020

(87) PCT Pub. No.: WO2019/031230
PCT Pub. Date: Feb. 14, 2019

(65) Prior Publication Data
US 2020/0159102 A1 May 21, 2020

(30) Foreign Application Priority Data
Aug. 7, 2017 (JP) .................................. 2017-152624

(51) Int. Cl.
*G03B 21/20* (2006.01)
*G02F 1/01* (2006.01)

(52) U.S. Cl.
CPC ....... *G03B 21/2073* (2013.01); *G02F 1/0105* (2013.01); *G02F 1/0123* (2013.01)

(58) Field of Classification Search
CPC ...... G03B 21/00–64; H04N 9/31–3197; G02F 1/00–397
See application file for complete search history.

(56) References Cited

U.S. PATENT DOCUMENTS

| | | | |
|---|---|---|---|
| 2009/0103151 A1* | 4/2009 | Horikawa | G03H 1/2294 359/9 |
| 2016/0320600 A1* | 11/2016 | Dake | G02B 21/082 |
| 2020/0233261 A1* | 7/2020 | Nagoya | G02F 1/31 |

FOREIGN PATENT DOCUMENTS

| | | |
|---|---|---|
| CN | 1757058 A | 4/2006 |
| CN | 102016696 A | 4/2011 |

(Continued)

OTHER PUBLICATIONS

International Search Report and Written Opinion of PCT Application No. PCT/JP2018/027680, dated Oct. 30, 2018, 09 pages of ISRWO.

*Primary Examiner* — Bao-Luan Q Le
*Assistant Examiner* — Christopher A Lamb, II
(74) *Attorney, Agent, or Firm* — CHIP LAW GROUP

(57) ABSTRACT

A phase modulator of the present disclosure includes a phase distribution arithmetic unit that generates, in a case of reproducing the same reproduction image over a plurality of frames or a plurality of subframes by a light phase modulation element, target phase distribution data that is allowed to reproduce the same reproduction image in at least two adjacent frames among the plurality of frames or in at least two adjacent subframes among the plurality of subframes and that changes phase distribution in the light phase modulation element.

12 Claims, 22 Drawing Sheets

(56) References Cited

FOREIGN PATENT DOCUMENTS

| | | |
|---|---:|---:|
| EP | 3081976 A1 | 10/2016 |
| GB | 2482066 A | 1/2012 |
| JP | 2005-084117 A | 3/2005 |
| JP | 2008-216578 A | 9/2008 |
| JP | 2009-524845 A | 7/2009 |
| JP | 2011-507022 A | 3/2011 |
| JP | 2014-206710 A | 10/2014 |
| JP | 2015-099323 A | 5/2015 |
| WO | 2008/108217 A1 | 9/2008 |
| WO | 2012/007763 A1 | 1/2012 |
| WO | 2015/087960 A1 | 6/2015 |

* cited by examiner

[FIG. 1]
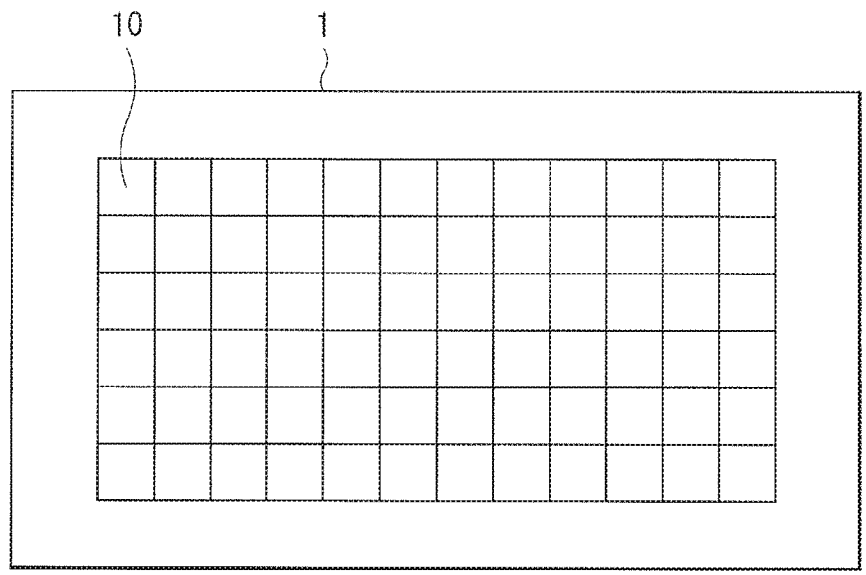
[FIG. 2]
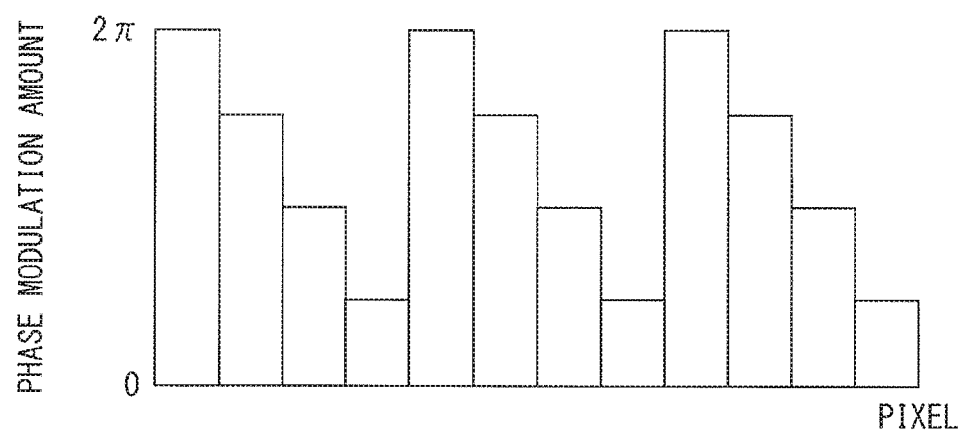

[FIG. 3]
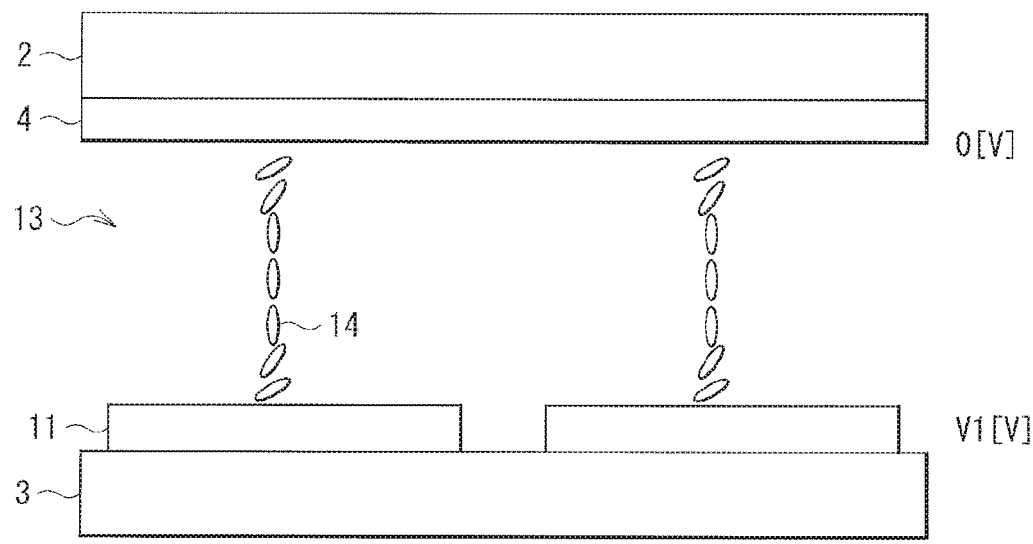

[FIG. 4]
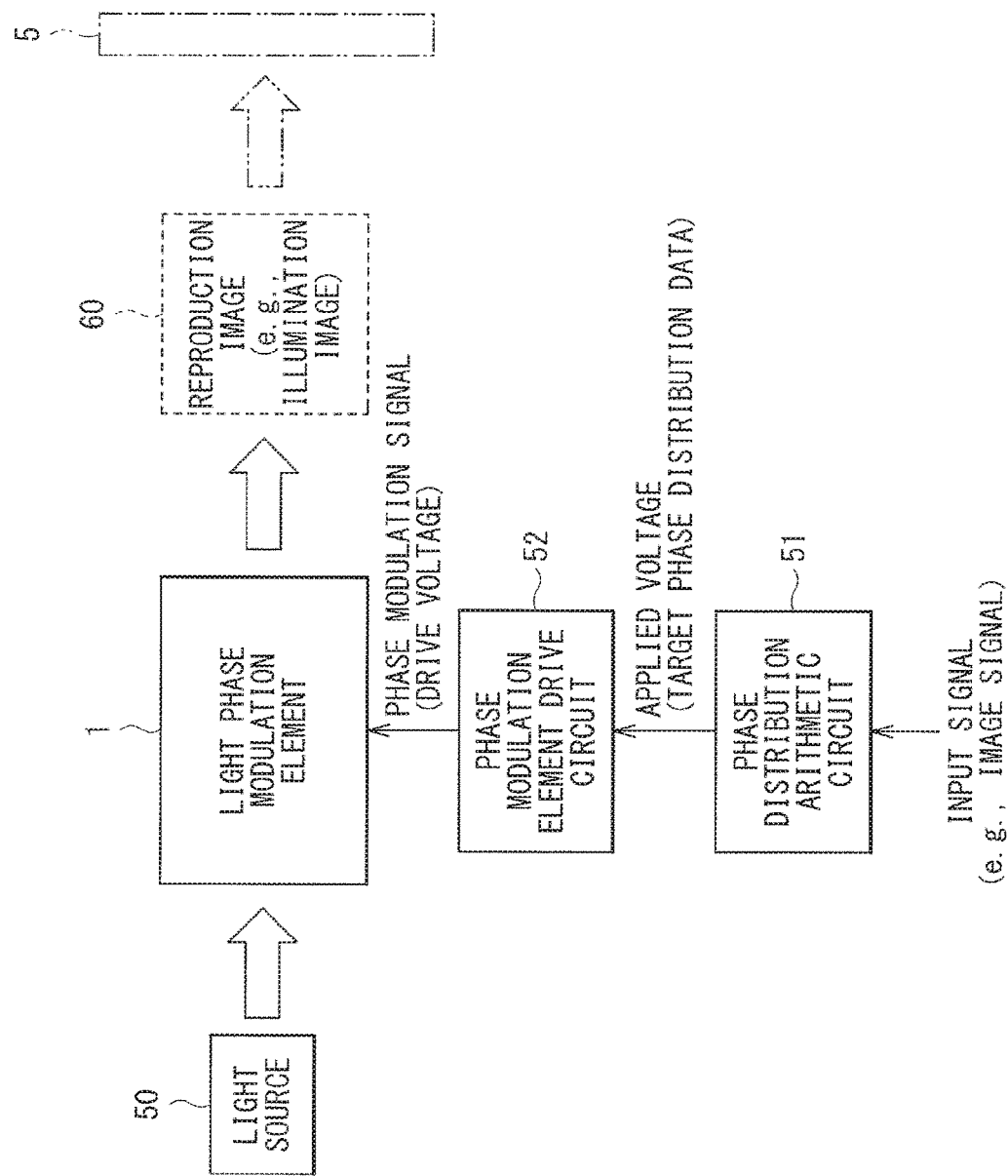

[FIG. 5]
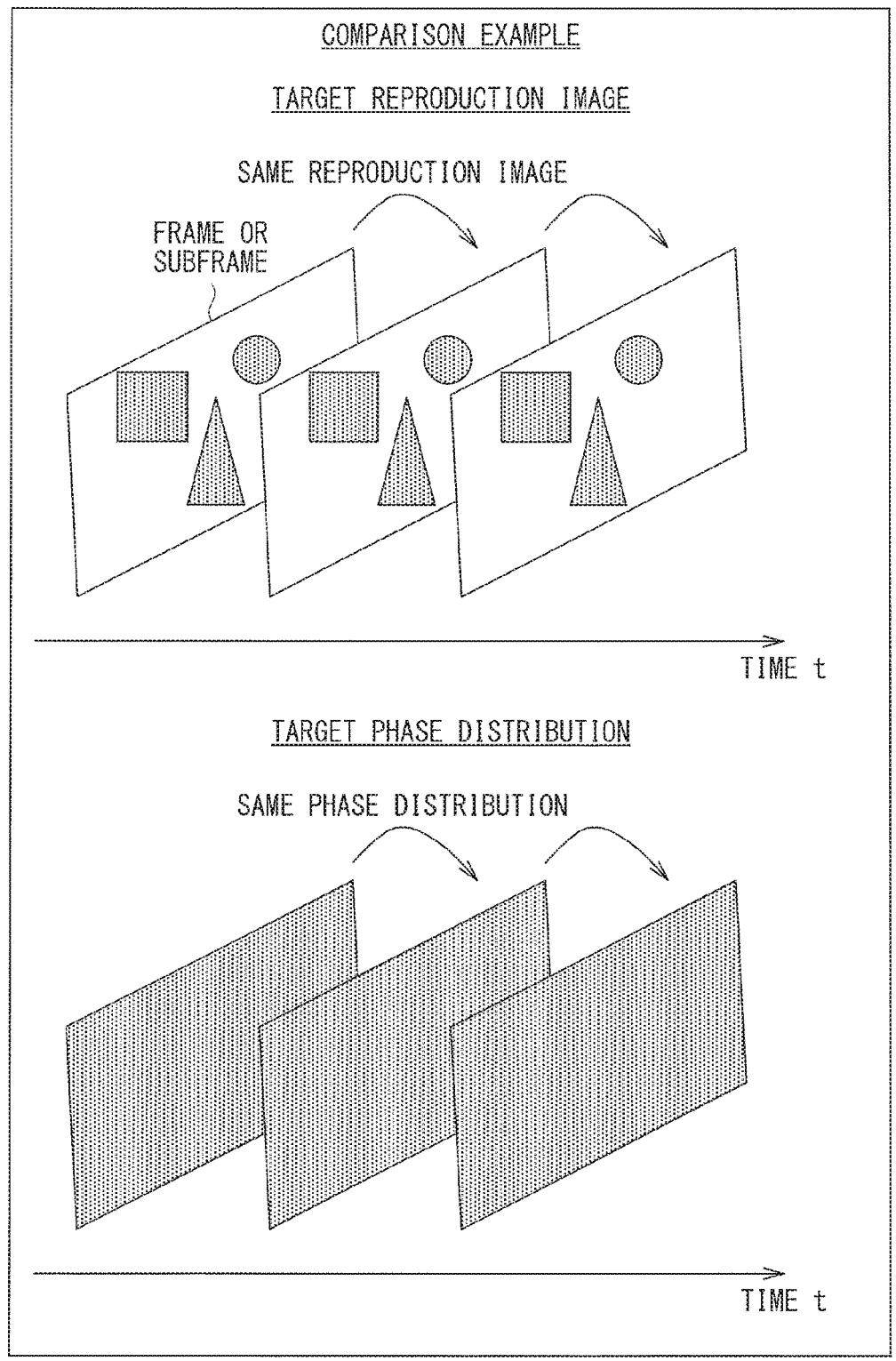

[FIG. 6]
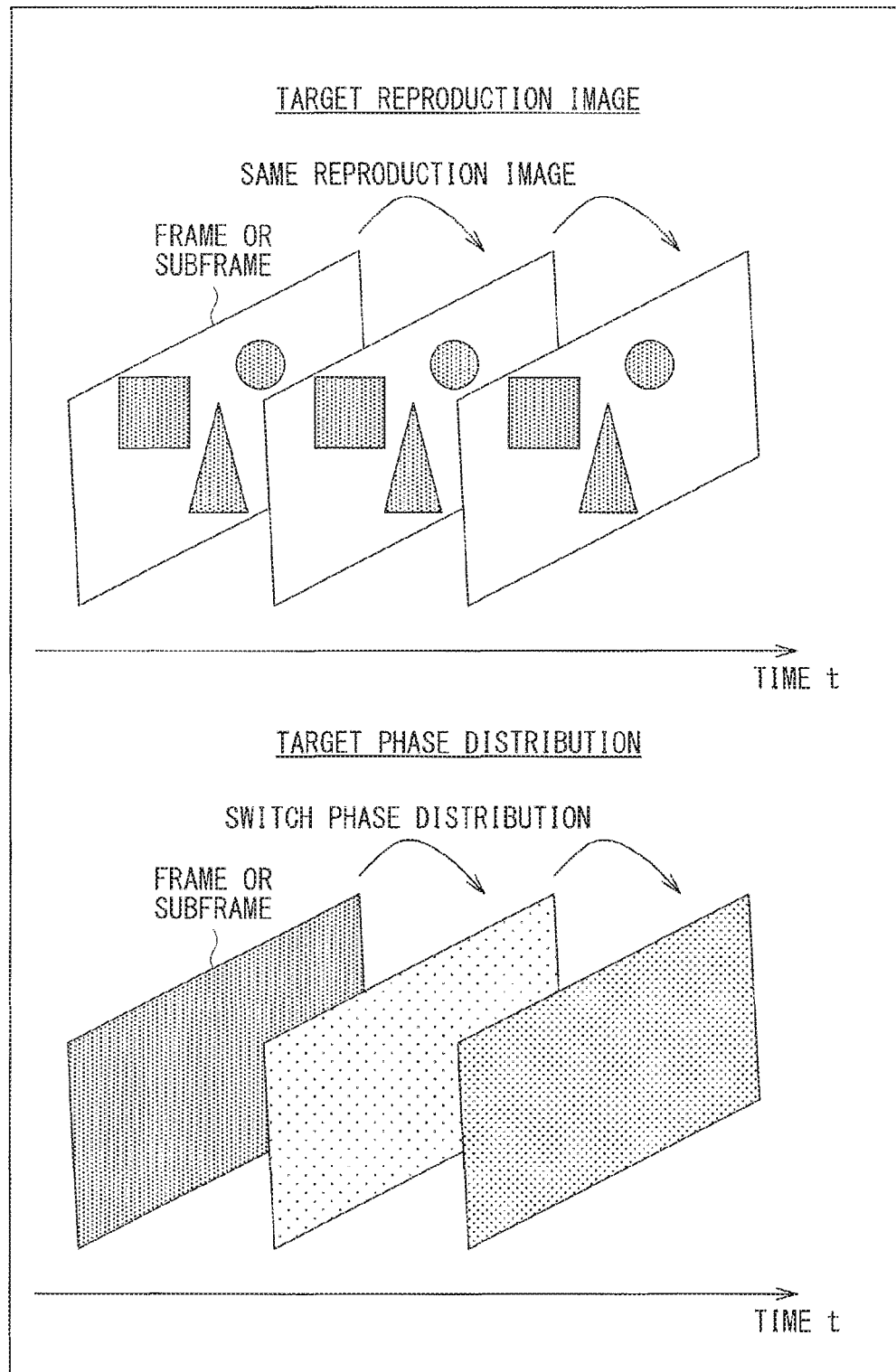

[FIG. 7]
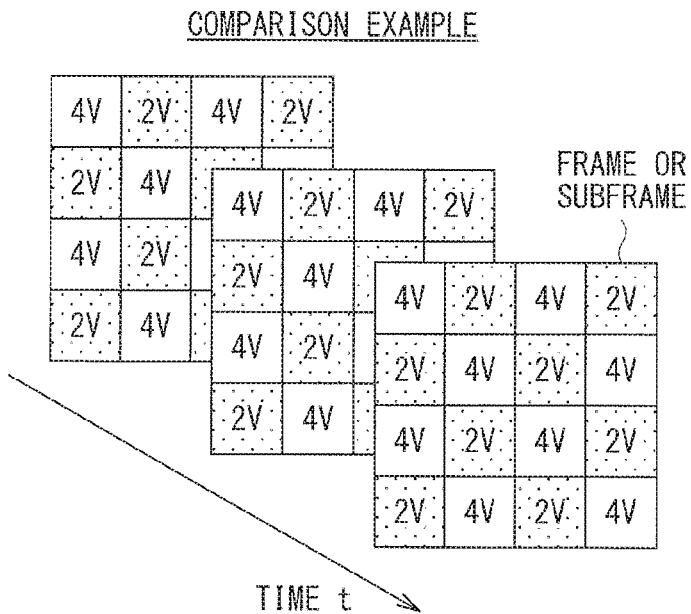
[FIG. 8]
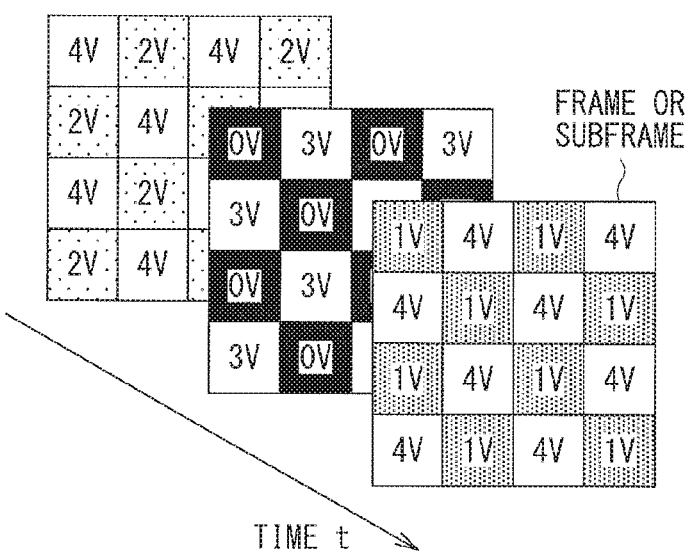

[FIG. 9]
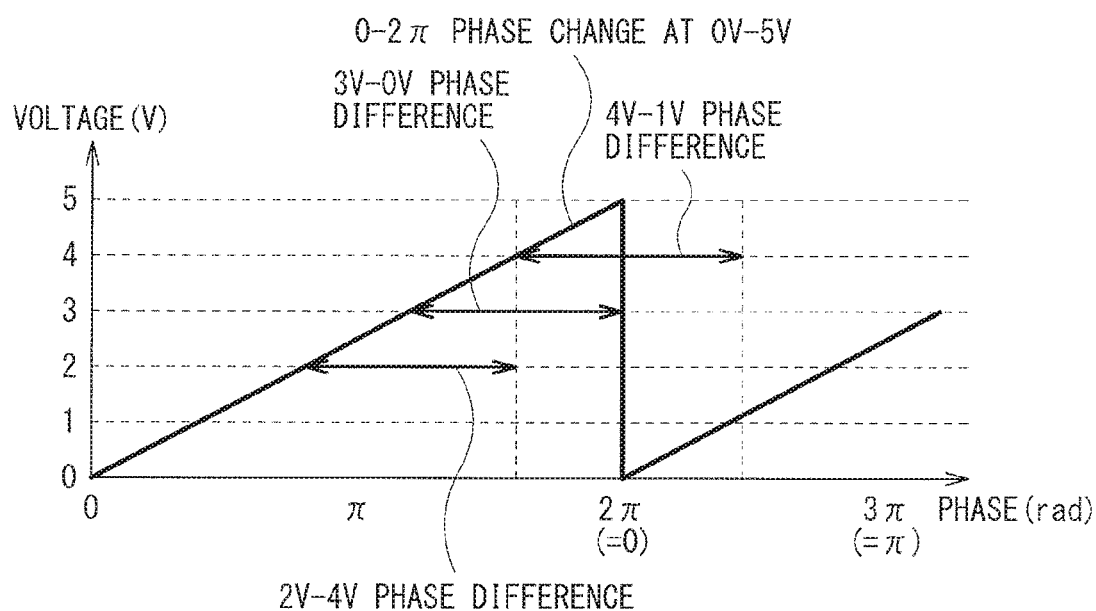
[FIG. 10]
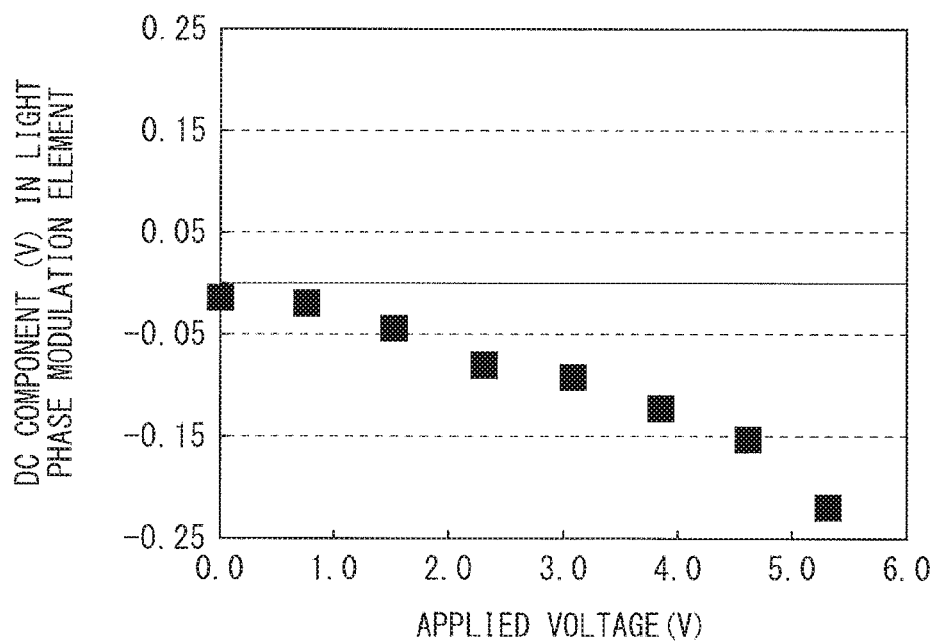

[FIG. 11]
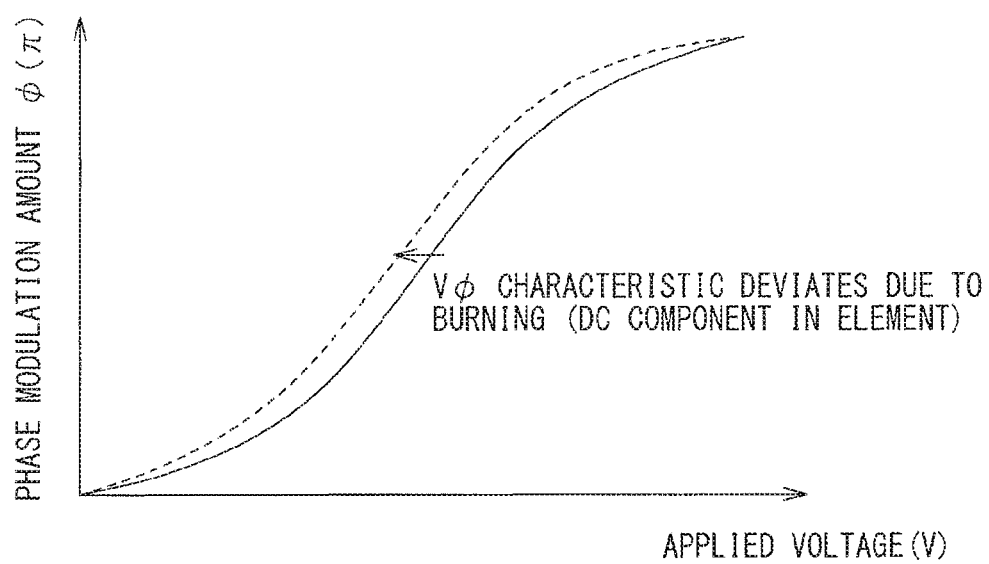

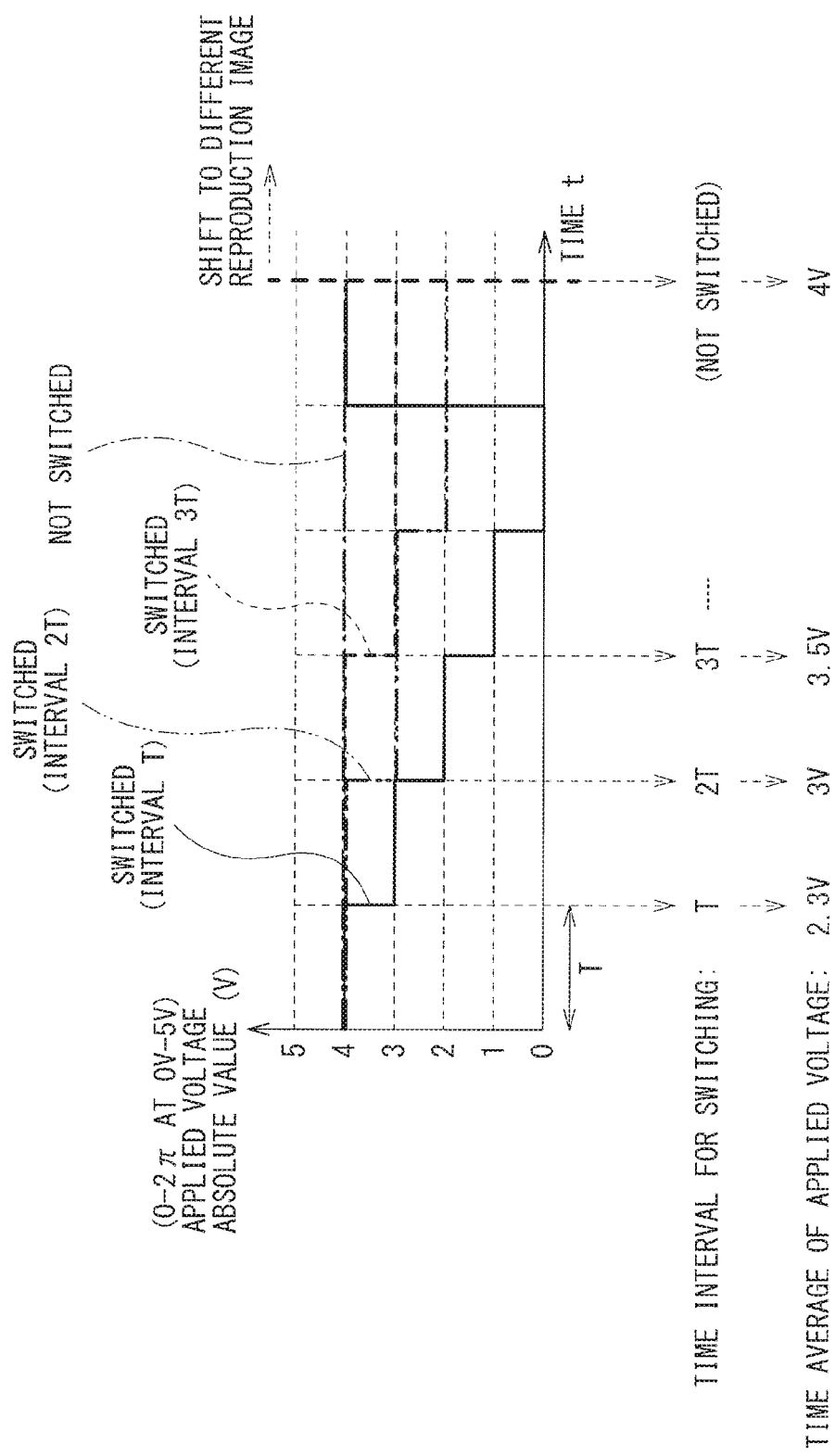
[FIG. 12]

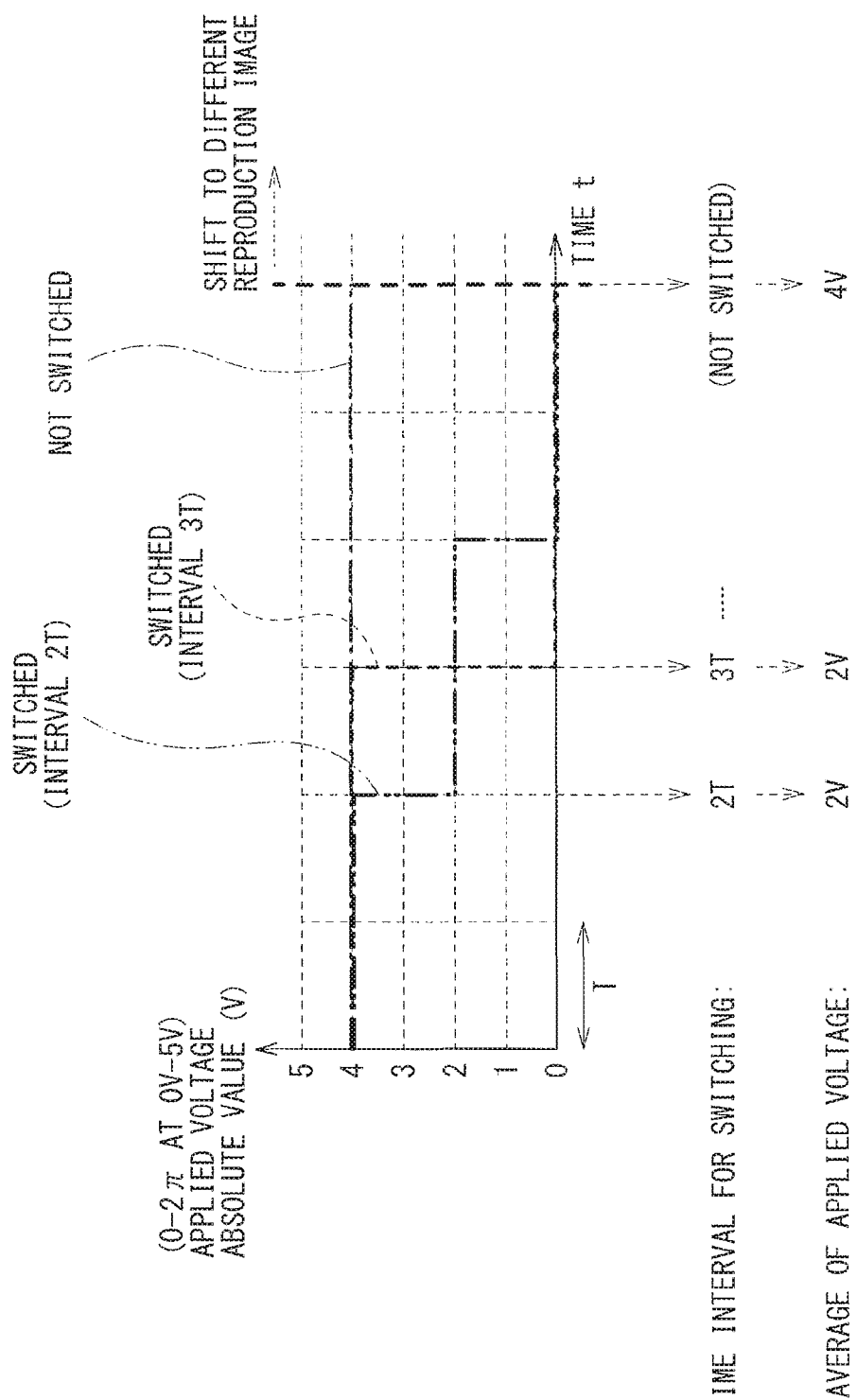

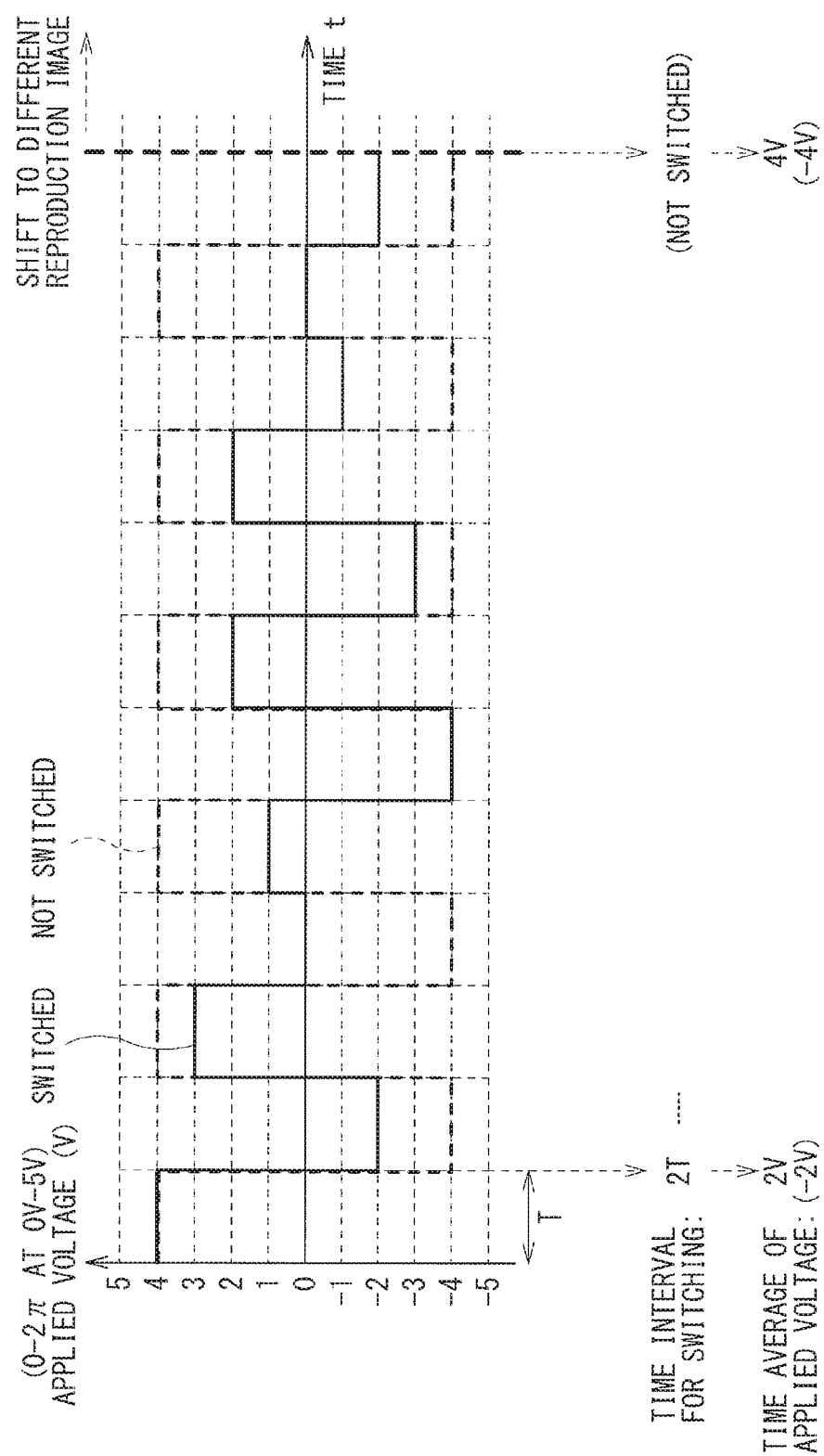
[FIG. 14]

[FIG. 15]
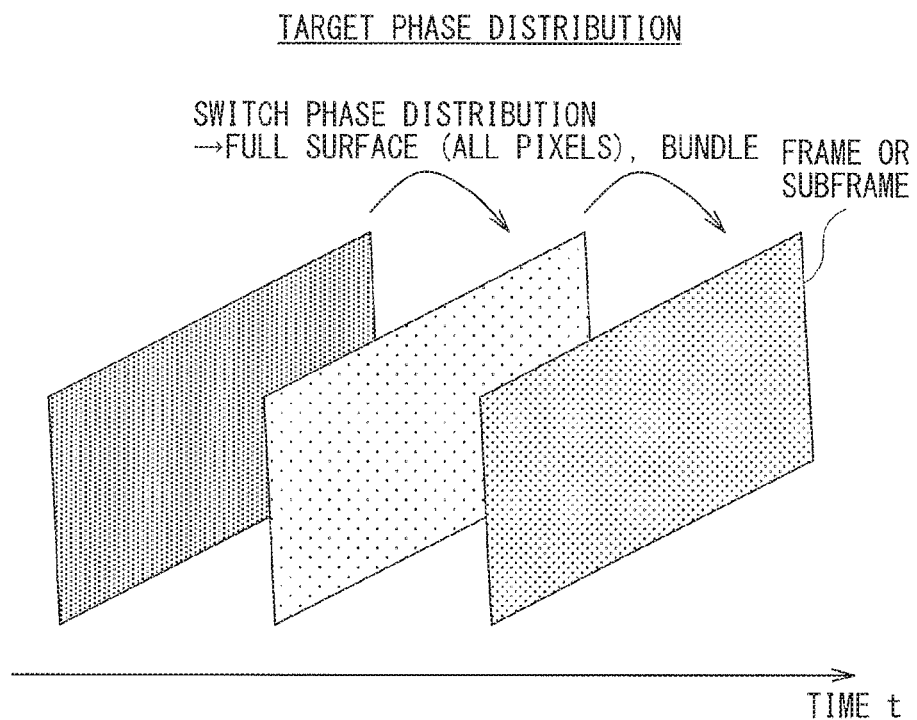

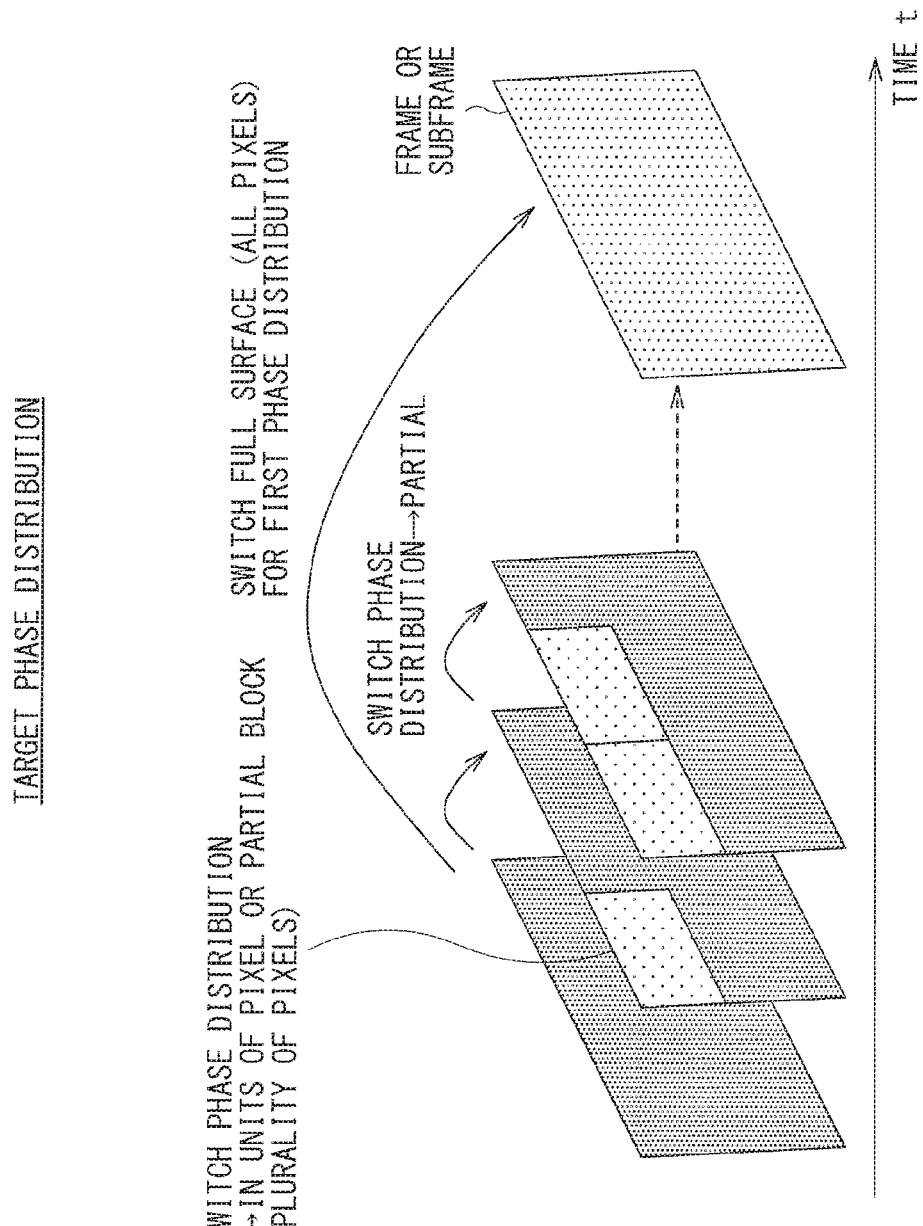

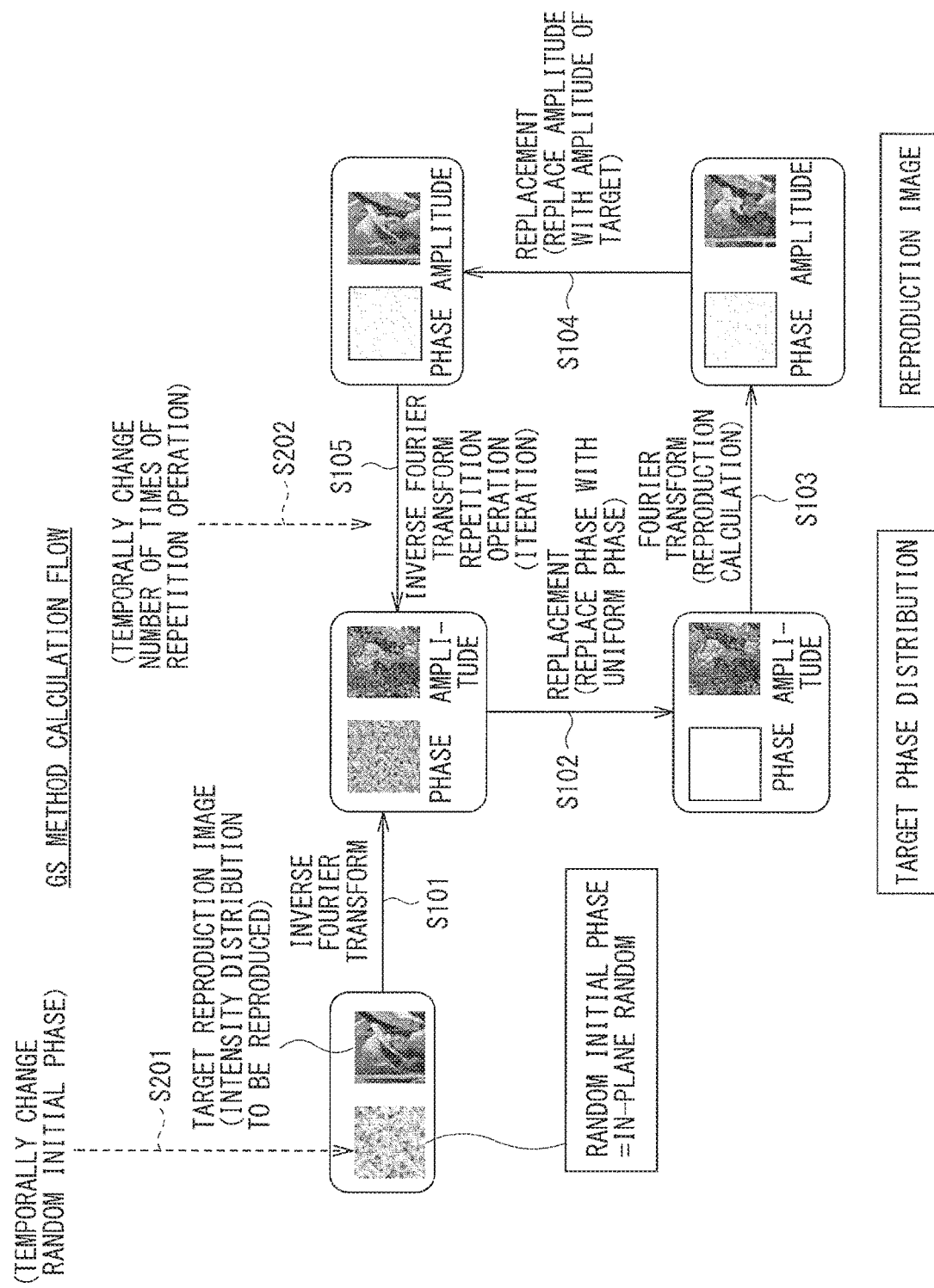
[FIG. 17]

[FIG. 18]
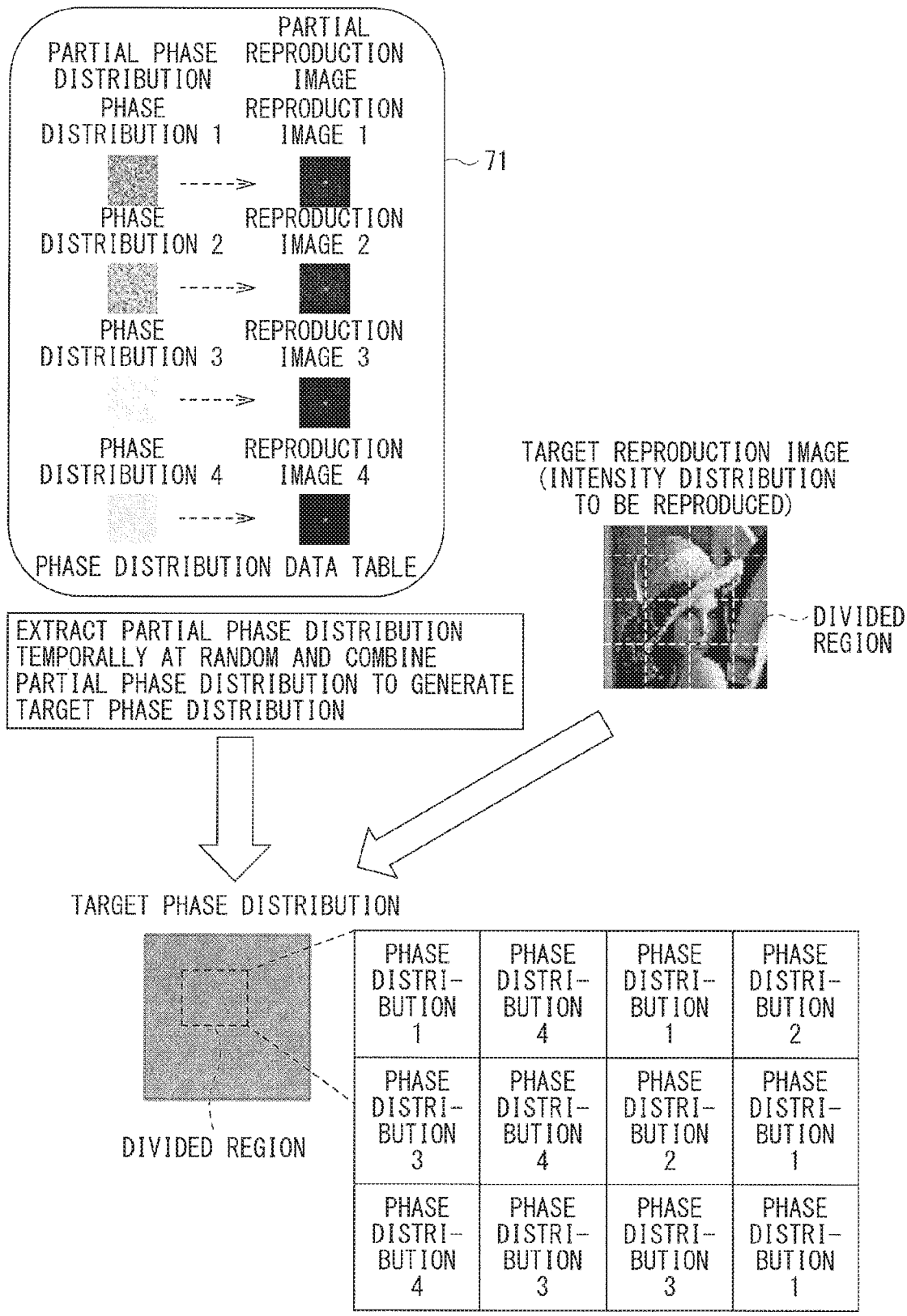

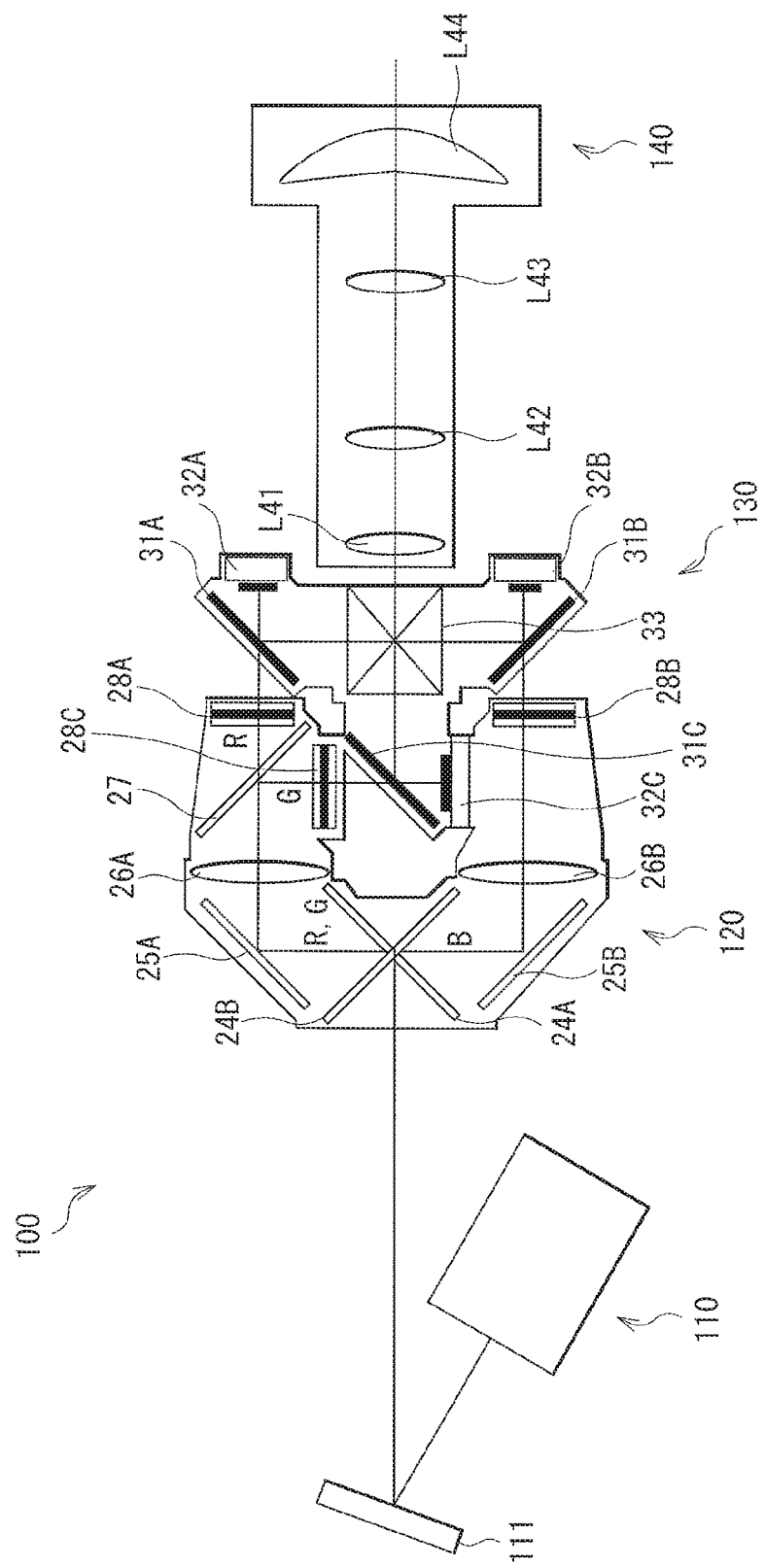
[FIG. 19]

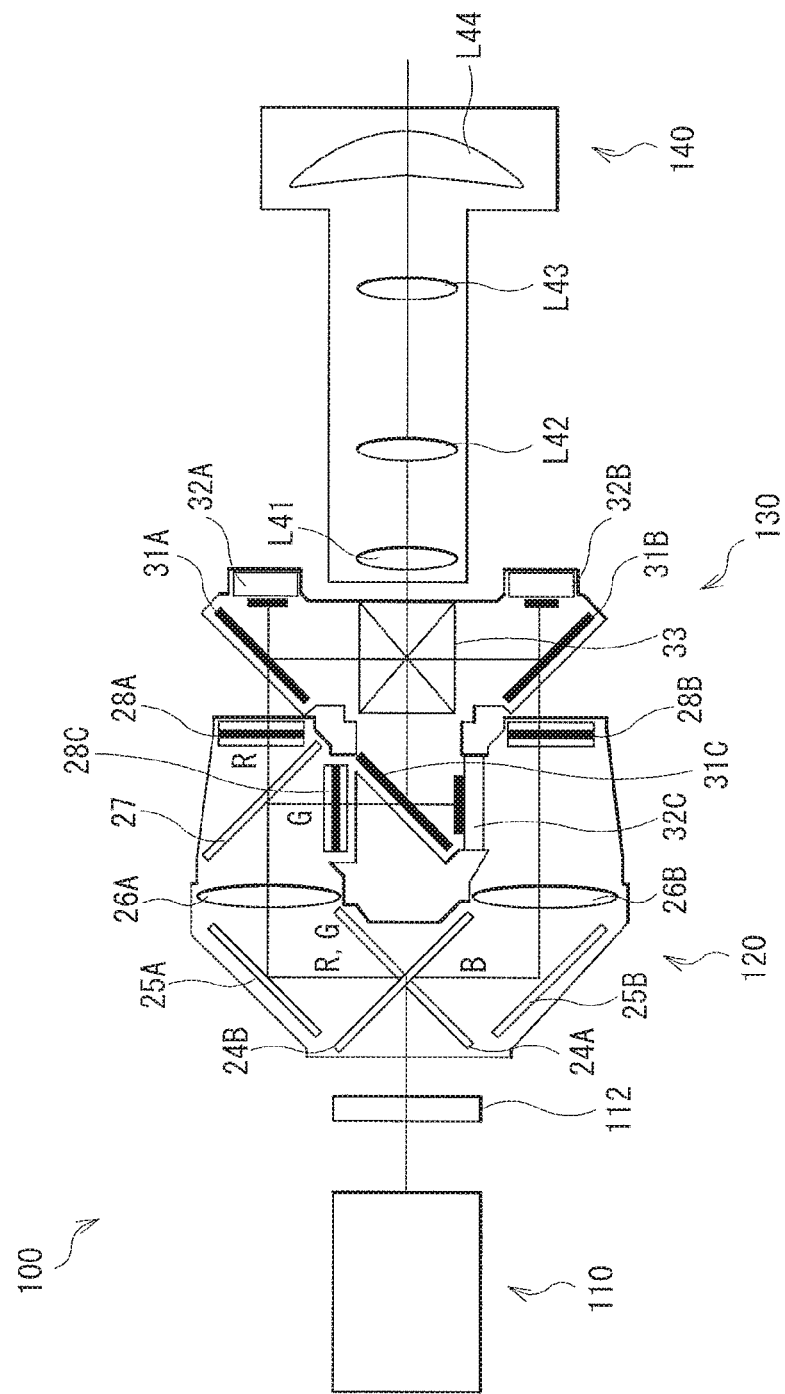
[FIG. 20]

[FIG. 21]

| OPTICAL ELEMENT | CONVEX LENS | CONCAVE LENS | LENS ARRAY | FRESNEL LENS | FREE-FORM SURFACE LENS |
|---|---|---|---|---|---|
| ◆LENS<br><br>CHANGE OPTICAL PATH LENGTH BY CHANGING THICKNESS OF MATERIAL | | | | | |
| ◆LIGHT PHASE MODULATION ELEMENT<br><br>CHANGE OPTICAL PATH LENGTH BY CHANGING REFRACTIVE INDEX<br><br>REFRACTIVE INDEX<br>LOW　　　　HIGH | | | | | |

[FIG. 22]
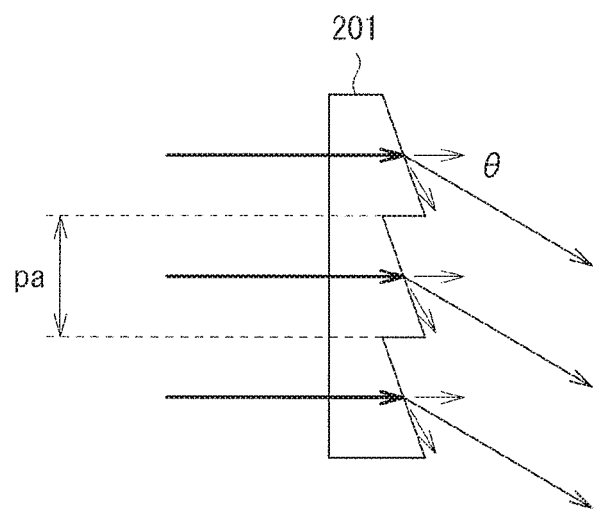
$$\sin\theta \leq \lambda/2pa$$
DIFFRACTION ANGLE: $\theta$
WAVELENGTH: $\lambda$
DIFFRACTION PITCH: $pa$

[FIG. 23]
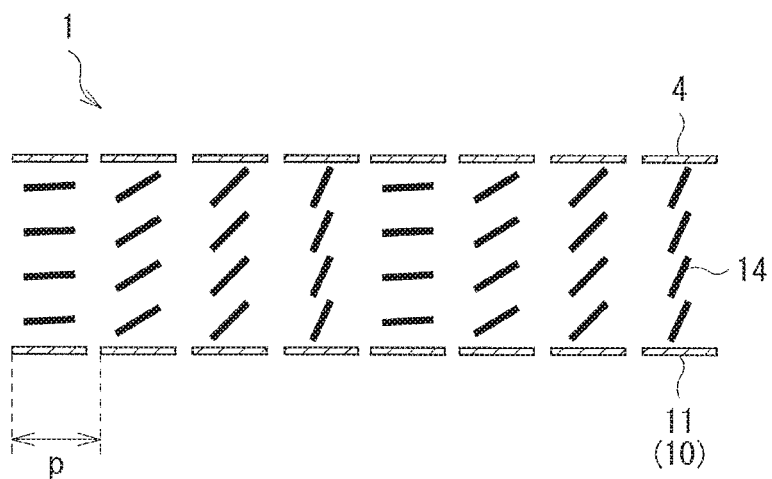
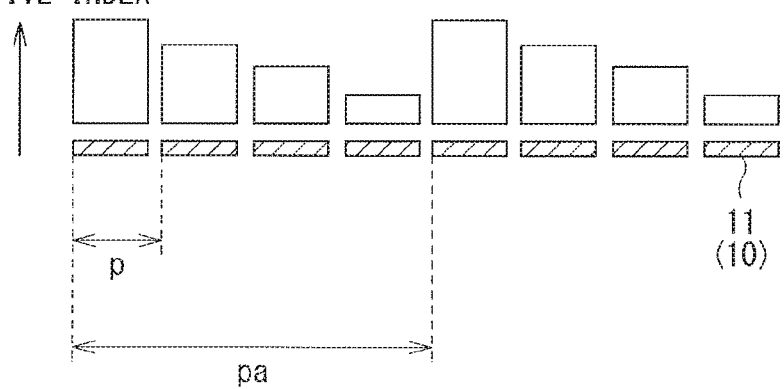

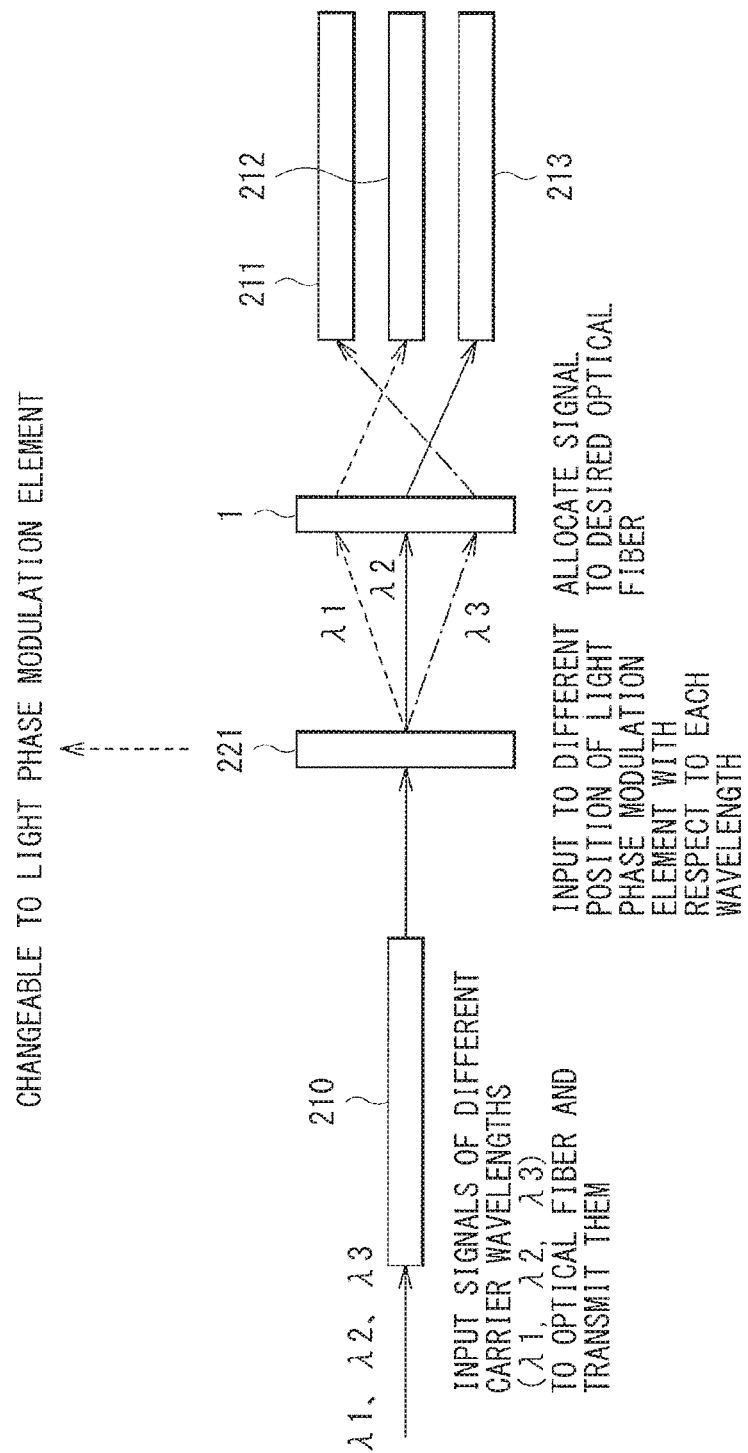
[FIG. 24]

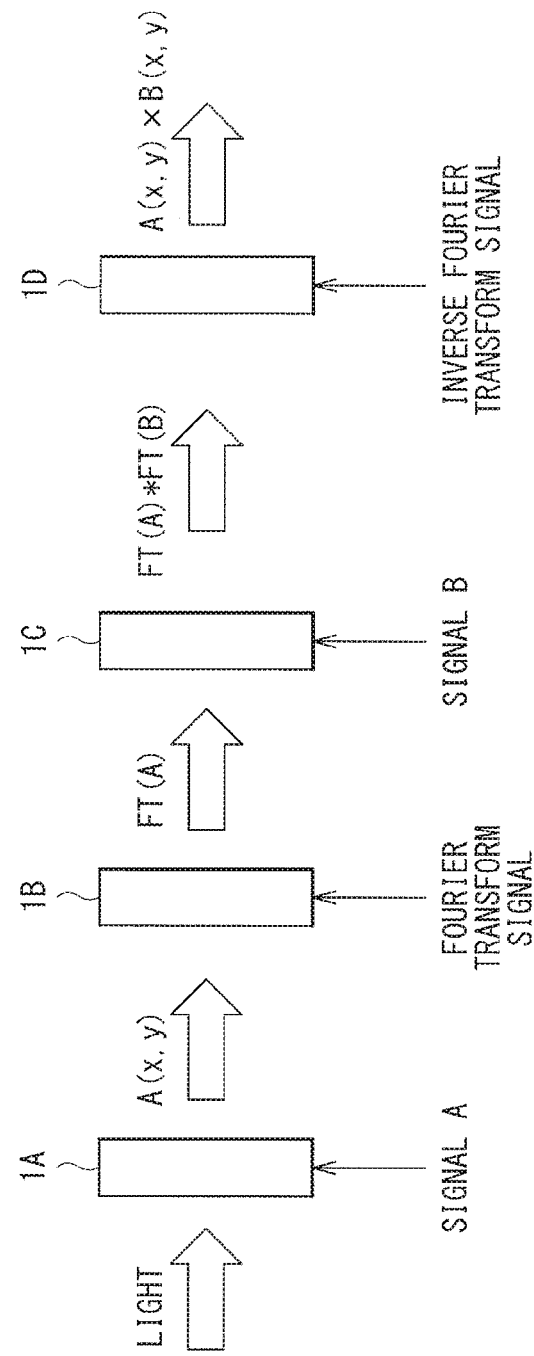
[FIG. 25]

PHASE MODULATOR, LIGHTING SYSTEM, AND PROJECTOR

CROSS REFERENCE TO RELATED APPLICATIONS

This application is a U.S. National Phase of International Patent Application No. PCT/JP2018/027680 filed on Jul. 24, 2018, which claims priority benefit of Japanese Patent Application No. JP 2017-152624 filed in the Japan Patent Office on Aug. 7, 2017. Each of the above-referenced applications is hereby incorporated herein by reference in its entirety.

TECHNICAL FIELD

The present disclosure relates to a phase modulator that modulates a phase of light. The present disclosure also relates to a lighting system that generates illumination light using a light phase modulation element, as well as a projector that projects an image based on the illumination light.

BACKGROUND ART

There is known a light phase modulation element that obtains a desired reproduction image by modulating a phase of light. The light phase modulation element includes, for example, a spatial light modulator (SLM) such as a liquid crystal panel. One application example of such a light phase modulation element is a technology of generating a reproduction image phase-modulated in accordance with the image by using the light phase modulation element in a lighting system and using the reproduction image as illumination light to a light intensity modulation element for image display. Moreover, the light phase modulation element is used for holography technology and the like. The light phase modulation element is also used for technologies such as an optical switch, an optical computer, and the like.

CITATION LIST

Patent Literature

PTL 1: Japanese Unexamined Patent Application Publication (Published Japanese Translation of PCT Application) No. 2009-524845
PTL 2: Japanese Unexamined Patent Application Publication (Published Japanese Translation of PCT Application) No. 2011-507022
PTL 3: Japanese Unexamined Patent Application Publication No. 2014-206710

SUMMARY OF THE INVENTION

In a case where the same reproduction image is reproduced over a plurality of frames or a plurality of subframes in a light phase modulation element, burning of pixels easily occurs. Moreover, especially in a case of using a laser light source as a light source of the light phase modulation element, a speckle easily occurs in the reproduction image.

It is desirable to provide a phase modulator, a lighting system, and a projector that make it possible to reduce occurrence of burning of pixels in the light phase modulation element and occurrence of a speckle due to the light phase modulation element.

A phase modulator according to an embodiment of the present disclosure includes a phase distribution arithmetic unit that generates, in a case of reproducing the same reproduction image over a plurality of frames or a plurality of subframes by a light phase modulation element, target phase distribution data that is allowed to reproduce the same reproduction image in at least two adjacent frames among the plurality of frames or in at least two adjacent subframes among the plurality of subframes and that changes a phase distribution in the light phase modulation element.

A lighting system according to an embodiment of the present disclosure includes a light source, a light phase modulation element that modulates a phase of light from the light source, and a phase distribution arithmetic unit that generates, in a case of reproducing the same reproduction image over a plurality of frames or a plurality of subframes by a light phase modulation element, target phase distribution data that is allowed to reproduce the same reproduction image in at least two adjacent frames among the plurality of frames or in at least two adjacent subframes among the plurality of subframes and that changes a phase distribution in the light phase modulation element.

A projector according to an embodiment of the present disclosure includes a lighting system and a light intensity modulation element that generates a projection image by modulating intensity of illumination light from the lighting system, in which the lighting system includes a light source, a light phase modulation element that modulates a phase of light from the light source, and a phase distribution arithmetic unit that generates, in a case of reproducing the same reproduction image over a plurality of frames or a plurality of subframes by a light phase modulation element, target phase distribution data that is allowed to reproduce the same reproduction image in at least two adjacent frames among the plurality of frames or in at least two adjacent subframes among the plurality of subframes and that changes a phase distribution in the light phase modulation element.

The phase modulator, the lighting system, and the projector according to an embodiment of the present disclosure make it possible to generate, in a case of reproducing the same reproduction image over a plurality of frames or a plurality of subframes by a light phase modulation element, target phase distribution data that is allowed to reproduce the same reproduction image in at least two adjacent frames among the plurality of frames or in at least two adjacent subframes among the plurality of subframes and that changes a phase distribution in the light phase modulation element.

In accordance with the phase modulator, the lighting system, or the projector according to an embodiment of the present disclosure, because the target phase distribution data is generated in a case of reproducing the same reproduction image by the light phase modulation element, the target phase distribution data being allowed to reproduce the same reproduction image and also changing phase distribution in the light phase modulation element, it is possible to reduce occurrence of burning of pixels in the light phase modulation element and occurrence of a speckle due to the light phase modulation element.

It is to be noted that the effects described herein are not necessarily limiting, and there may be any of effects set forth herein.

BRIEF DESCRIPTION OF DRAWING

FIG. 1 is a schematic plan view of an example of a light phase modulation element applied to a phase modulator according to a first embodiment of the present disclosure.

FIG. 2 is an explanatory drawing illustrating an example relationship between a pixel position and a phase modulation amount in the light phase modulation element.

FIG. 3 is a cross-sectional view of an example configuration of the light phase modulation element.

FIG. 4 is a block diagram illustrating an example circuit configuration of the phase modulator according to the first embodiment.

FIG. 5 is an explanatory drawing illustrating an example relationship between a target reproduction image and a target phase distribution with respect to each frame or each subframe in a phase modulator according to a comparison example.

FIG. 6 is an explanatory drawing illustrating an example relationship between a target reproduction image and a target phase distribution with respect to each frame or each subframe in the phase modulator according to the first embodiment.

FIG. 7 is an explanatory drawing illustrating an example of applied voltage with respect to each frame or each subframe in a light phase modulation element in the phase modulator according to the comparison example.

FIG. 8 is an explanatory drawing illustrating an example of applied voltage to the light phase modulation element in the phase modulator according to the first embodiment with respect to each frame or each subframe.

FIG. 9 is an explanatory drawing illustrating an example relationship between the applied voltage and a phase with respect to each frame or each subframe in the light phase modulation element illustrated in FIG. 8.

FIG. 10 is an explanatory drawing illustrating an example relationship between the applied voltage in the light phase modulation element and a DC component to the element after aging.

FIG. 11 is an explanatory drawing illustrating an example relationship between the applied voltage and a phase modulation amount in the light phase modulation element.

FIG. 12 is an explanatory drawing illustrating a first example of a time interval for switching a phase distribution of each pixel in the phase modulator according to the first embodiment.

FIG. 13 is an explanatory drawing illustrating a second example of the time interval for switching the phase distribution of each pixel in the phase modulator according to the first embodiment.

FIG. 14 is an explanatory drawing illustrating an example of a switching operation of the phase distribution in a case of performing polarity inversion driving in the phase modulator according to the first embodiment.

FIG. 15 is an explanatory drawing illustrating an example of the target phase distribution in a case where a switching unit of the phase distribution is a bundle of all the pixels in the phase modulator according to the first embodiment.

FIG. 16 is an explanatory drawing illustrating an example of the target phase distribution in a case where the switching unit of the phase distribution is some objective pixels in the phase modulator according to the first embodiment.

FIG. 17 is an explanatory drawing illustrating a first example of a technique of generating target phase distribution data by the phase modulator according to a second embodiment.

FIG. 18 is an explanatory drawing illustrating a second example of the technique of generating the target phase distribution data by the phase modulator according to the second embodiment.

FIG. 19 is a configuration diagram illustrating a first application example in which the light phase modulation element is applied to a projector.

FIG. 20 is a configuration diagram illustrating a second application example in which the light phase modulation element is applied to a projector.

FIG. 21 is an explanatory drawing illustrating an application example in which the light phase modulation element is applied to various optical elements.

FIG. 22 is a cross-sectional view of an example of a blazed diffraction grating.

FIG. 23 is an explanatory drawing illustrating an application example in which the light phase modulation element is applied to the blazed diffraction grating.

FIG. 24 is an explanatory drawing illustrating an application example in which the light phase modulation element is applied to an optical switch.

FIG. 25 is an explanatory drawing illustrating an application example in which the light phase modulation element is applied to an optical computer.

MODES FOR CARRYING OUT THE INVENTION

In the following, embodiments of the present disclosure are described in detail with reference to the drawings. It is to be noted that the description is made in the following order.
1. First Embodiment (FIGS. 1 to 16)
　1.1 Outline of Phase Modulator
　1.2 Problem with Phase Modulator, Configuration for Solving the Problem, and Operation
　1.3 Effects
2. Second Embodiment (FIGS. 17 to 18)
　2.1 Configuration and Operation
　2.2 Effects
3. Third Embodiment (Application Example of Light Phase Modulation Element) (FIGS. 19 to 25)
　3.1 Application Example to Projector
　3.2 Application Example to Various Optical Elements
　3.3 Application Example to Optical Switch
　3.4 Application Example to Optical Computer
4. Other Embodiments 1. First Embodiment 1.1 Outline of Phase Modulator FIG. 1 schematically illustrates an example of a light phase modulation element 1 applied to a phase modulator according to a first embodiment of the present disclosure. FIG. 2 illustrates an example relationship between a pixel position and a phase modulation amount of the light phase modulation element 1. FIG. 3 illustrates an example cross-sectional configuration of the light phase modulation element 1.

The light phase modulation element 1 has a plurality of pixels 10 arranged in a matrix. In the light phase modulation element 1, it is possible to use the pixels 10 as a diffraction grating by modulating a phase of light from a light source with respect to each pixel 10. For example, as illustrated in FIG. 2, it is possible to configure a blazed diffraction grating. In FIG. 2, a horizontal axis indicates the pixel position and a vertical axis indicates the phase modulation amount. The modulation amount of the phase is, for example, in a range of 0 to $2\pi$.

The light phase modulation element 1 includes, for example, a phase modulation liquid crystal panel. The light phase modulation element 1 includes, as illustrated in FIG. 3, for example, a first glass substrate 2 and a second glass substrate 3 disposed opposite to each other. A liquid crystal layer 13 containing liquid crystal molecules 14 is sealed by an unillustrated sealing member between the first glass substrate 2 and the second glass substrate 3.

The first glass substrate 2 is provided with a counter electrode (common electrode) 4. The second glass substrate 3 is provided with a plurality of pixel electrodes 11. FIG. 3 illustrates, as an example of the plurality of pixel electrodes 11, only two adjacent pixel electrodes.

The counter electrode 4 is applied with common voltage (e.g., 0 [V]) common to the plurality of pixel electrodes 11. The plurality of pixel electrodes 11 is applied with applied voltage (e.g., V1 [V]) in accordance with an input signal. The phase modulation amount of each pixel 10 in the light phase modulation element 1 changes depending on the applied voltage.

The light phase modulation element 1 may be a reflective phase modulation liquid crystal panel or a transmissive phase modulation liquid crystal panel. In a case of the reflective phase modulation liquid crystal panel, the counter electrode 4 includes a transparent electrode that transmits light, and the pixel electrode 11 includes a reflective electrode that reflects light. In a case of the transmissive phase modulation liquid crystal panel, both the counter electrode 4 and the pixel electrode 11 include the transparent electrode that transmits light.

Such a light phase modulation element 1 is used as a portion of the lighting system that generates illumination light to the light intensity modulation element in a projector, for example. Moreover, the light phase modulation element 1 is also used in a holography technology or the like. Furthermore, the light phase modulation element 1 is also used in technologies such as an optical switch and an optical computer.

FIG. 4 illustrates an example circuit configuration of the phase modulator according to the first embodiment.

The phase modulator includes the light phase modulation element 1 that modulates the phase of light from a light source 50, a phase distribution arithmetic circuit 51, and a phase modulation element drive circuit 52.

The phase distribution arithmetic circuit 51 is a phase distribution arithmetic unit that generates target phase distribution data (phase modulation signal) on the basis of an input signal. The target phase distribution data is data having a phase distribution that makes it possible to reproduce an aimed reproduction image 60 (target reproduction image) by the light phase modulation element 1.

Here, for example, in a case where the light phase modulation element 1 is used as a portion of the lighting system in the projector, the input signal is an image signal, for example. In this case, the reproduction image 60 is an illumination image that illuminates an illuminated object 5. The illuminated object 5 is, for example, a light intensity modulation element such as an intensity modulation liquid crystal panel in the projector. In this case, the target phase distribution data is data having a phase distribution pattern that makes it possible to form an illumination image with a luminance distribution corresponding to the image to be displayed by the projector.

The diffraction element drive circuit 52 generates applied voltage (drive voltage) based on the target phase distribution data generated by the phase distribution arithmetic circuit 51, and drives the light phase modulation element 1 to bring each pixel 10 into the aimed phase distribution.

The light phase modulation element 1 modulates the phase of light from the light source 50 on the basis of the applied voltage given by the diffraction element drive circuit 52.

[1.2 Problem with Phase Modulator, Configuration for Solving the Problem, and Operation]

FIG. 5 illustrates an example relationship between the target reproduction image and the target phase distribution with respect to each frame or each subframe in a phase modulator according to a comparison example. FIG. 7 illustrates an example of applied voltage with respect to each frame or each subframe in the light phase modulation element 1 in the phase modulator according to the comparison example.

In the comparison example in FIG. 5, when attempting to reproduce the same reproduction image over a plurality of frames or a plurality of subframes in the light phase modulation element 1, the target phase distribution in the light phase modulation element 1 similarly includes the same phase distribution over the plurality of frames or the plurality of subframes. In this case, as illustrated in FIG. 7, the same applied voltage is applied to each pixel 10 in the light phase modulation element 1 over the plurality of frames or the plurality of subframes. This causes burning to easily occur in each pixel 10.

It is to be noted that an example mode where the same target reproduction image is used in succession over the plurality of frames or subframes may correspond to a case where an image is displayed at 120 Hz by repeating a single frame two times on the basis of a 60-Hz image signal when using the light phase modulation element 1 as a portion of the lighting system in the projector, for example. Alternatively, the example mode may correspond to a case where the same still image is simply kept displayed over a plurality of frames.

FIG. 6 illustrates an example relationship between the target reproduction image and the target phase distribution with respect to each frame or each subframe in a phase modulator according to the first embodiment. FIG. 8 illustrates an example of applied voltage with respect to each frame or each subframe in the light phase modulation element 1 in the phase modulator according to the first embodiment.

In comparison to the comparison example in FIG. 5, according to the present embodiment, as illustrated in FIG. 6, when attempting to reproduce the same reproduction image over a plurality of frames or a plurality of subframes in the light phase modulation element 1, the target phase distribution in the light phase modulation element 1 is switched to a different phase distribution where appropriate. For example, the phase distribution is switched with respect to each frame or each subframe where appropriate. In this case, as illustrated in FIG. 8, each frame or each subframe of the pixel 10 in the light phase modulation element 1 is applied with different applied voltage, for example. This makes it possible to reduce occurrence of burning in each pixel 10, compared to the comparison example in FIG. 7.

It is to be noted that there are many patterns of phase distribution (patterns of applied voltage) allowed to reproduce the same reproduction image. Thus, even when switching of the phase distribution (switching of the applied voltage) is performed, it is possible to reproduce the same reproduction image with the light phase modulation element 1 by using an appropriate pattern of the phase distribution (pattern of the applied voltage).

In the present embodiment, in a case where the phase distribution arithmetic circuit 51 reproduces the same reproduction image over a plurality of frames or a plurality of subframes in the light phase modulation element 1, target phase distribution data is generated that is allowed to reproduce the same reproduction image in at least two adjacent frames among the plurality of frames or in at least two adjacent subframes among the plurality of subframes and that changes the phase distribution in the light phase modulation element 1.

The phase distribution arithmetic circuit 51 generates the target phase distribution data that changes the phase distribution in at least some pixels 10 among the plurality of pixels 10.

The phase distribution arithmetic circuit 51 generates the target phase distribution data that changes the applied voltage to at least some pixels 10 among the plurality of pixels 10.

The phase distribution arithmetic circuit 51 generates the target phase distribution data that averages the applied voltage to each pixel 10 during a period over a plurality of frames or a plurality of subframes.

In the following, a specific example of the target phase distribution data that changes the applied voltage while allowing for reproduction of the same reproduction image is described.

FIG. 9 illustrates an example relationship between the applied voltage and the phase with respect to each frame or each subframe in the light phase modulation element 1 as illustrated in FIG. 8. In FIG. 9, the horizontal axis indicates the phase (rad) and the vertical axis indicates the voltage (V).

FIG. 9 takes an example case where a range of the applied voltage of 0V to 5V is equivalent to a phase range of 0 to 2 π. In this case, as illustrated in FIG. 9, for example, a phase difference in a case where the range of the applied voltage is 2V to 4V, the phase difference in a case where the range of the applied voltage is 3V to 0V, and the phase difference in a case where the range of the applied voltage is 4V to 1V are substantially the same. In this manner, it is possible to change the applied voltage while keeping the phase difference the same. The phase distribution arithmetic circuit 51 generates the target phase distribution data that changes the applied voltage while keeping the phase difference the same as described above.

FIG. 10 illustrates an example relationship between the applied voltage (horizontal axis) in the light phase modulation element 1 and the DC (direct current) component (vertical axis) in the element after aging (time elapsing operation). FIG. 10 illustrates characteristics after driving the light phase modulation element 1 for two hours without switching the phase distribution. FIG. 11 illustrates an example relationship between the applied voltage (V) (vertical axis) and the phase modulation amount Φ (π) (vertical axis) in the light phase modulation element 1. In FIG. 11, a solid line indicates a characteristic curve before aging, and a broken line indicates the characteristic curve after aging.

As illustrated in FIG. 10, as the voltage applied to the pixel 10 increases, the DC component in the light phase modulation element 1 becomes larger (burning occurs). This causes deviations of characteristic curves of the applied voltage and the phase modulation amount between before and after aging, as illustrated in FIG. 11. This makes it difficult to obtain the aimed phase modulation amount and degrades the image quality of the aimed reproduction image. From this, it is contemplated that burning is reduced if it is possible to keep the applied voltage to the pixel 10 low.

FIG. 12 illustrates a first example of a time interval for switching the phase distribution of each pixel 10 in the phase modulator according to the first embodiment. In FIG. 12, the horizontal axis indicates time t and the vertical axis indicates an absolute value (V) of the applied voltage to any pixel 10. It is to be noted that FIG. 12 takes an example case where the range of the applied voltage of 0V to 5V is equivalent to the phase range of 0 to 2 π, as in FIG. 9.

FIG. 12 illustrates, as one example, a case where the phase distribution is not switched and cases where the phase distribution is switched at time intervals of T, 2T, and 3T. It is to be noted that T is equivalent to a switching interval of one frame or one subframe. Moreover, FIG. 12 indicates a time average value of the applied voltage in each case. FIG. 12 takes an example of a case where the applied voltage is changed by 1 V (shifted by 1 V) per switching of the phase distribution.

As illustrated in FIG. 12, switching of the phase distribution reduces the time average value of the applied voltage. Moreover, as the time interval of switching the phase distribution becomes shorter, the time average value of the applied voltage becomes smaller, thereby reducing burning. Therefore, it is desirable that the phase distribution be switched as fast as possible.

FIG. 13 illustrates a second example of the time interval for switching the phase distribution of each pixel 10 in the phase modulator according to the first embodiment. In FIG. 13, the horizontal axis indicates the time t and the vertical axis indicates the absolute value (V) of the applied voltage to any pixel 10. It is to be noted that FIG. 13 takes an example case where the range of the applied voltage of 0V to 5V is equivalent to the phase range of 0 to 2π, as in FIG. 9.

FIG. 13 illustrates, as one example, a case where the phase distribution is not switched and cases where the phase distribution is switched at time intervals of 2T and 3T. It is to be noted that T is equivalent to a switching interval of one frame or one subframe. Moreover, FIG. 13 indicates a time average value of the applied voltage in each case.

FIG. 13 takes an example case where a shift amount of the applied voltage is changed depending on the time interval for switching the phase distribution. As illustrated in FIG. 13, it is desirable that the time average value of the applied voltage be equalized regardless of the shift amount of the applied voltage.

FIG. 14 illustrates an example switching operation of the phase distribution in a case of performing polarity inversion driving in the phase modulator according to the first embodiment. In FIG. 14, the horizontal axis indicates the time t and the vertical axis indicates the applied voltage (V) to any pixel 10. It is to be noted that FIG. 14 takes an example case where the range of the applied voltage of 0V to 5V is equivalent to the phase range of 0 to 2 π, as absolute values.

Each pixel 10 may be applied with the applied voltage that periodically inverts its polarity. In this case, the phase distribution arithmetic circuit 51 may generate the target phase distribution data in which the applied voltage to each pixel 10 is averaged during a period over a plurality of frames or a plurality of subframes with respect to each polarity.

FIG. 14 takes an example case where the polarity of the applied voltage is inverted with respect to each time interval T, as one example. FIG. 14 illustrates, as one example, a case where the phase distribution is not switched and a case where the phase distribution is switched. It is to be noted that T is equivalent to a switching interval of one frame or one subframe. Moreover, FIG. 14 indicates a time average value of the applied voltage in each case.

As illustrated in FIG. 14, it is desirable that the phase distribution be switched so as to equalize the absolute values of the time average values of the applied voltage between a case where the polarity of the applied voltage is positive and a case where the polarity is negative.

FIG. 15 illustrates an example of the target phase distribution in a case where a switching unit of the phase distribution is a bundle of all the pixels in the phase modulator according to the first embodiment.

The phase distribution arithmetic circuit 51 may generate the target phase distribution data that changes the phase distribution in all the pixels 10 of the plurality of pixels 10 as illustrated in FIG. 15.

FIG. 16 illustrates an example of the target phase distribution in a case where the switching unit of the phase distribution is some objective pixels in the phase modulator according to the first embodiment.

The phase distribution arithmetic circuit 51 may change the phase distribution of some objective pixels among the plurality of pixels 10 with respect to each frame or each subframe as illustrated in FIG. 16. The phase distribution arithmetic circuit 51 may generate the target phase distribution data that changes the objective pixels to average the applied voltage to each pixel 10 during a period over a plurality of frames or a plurality of subframes.

In this case, the phase distribution arithmetic circuit 51 may generate the target phase distribution data in which the phase distribution of all of the plurality of pixels 10 is changed in the last frame of the plurality of frames or in the last subframe of the plurality of subframes with respect to the first frame of the plurality of frames or the first subframe of the plurality of subframes, as illustrated in FIG. 16. In this case, the phase distribution is switched only in some objective pixels, compared to the case in which the switching unit of the phase distribution is a bundle of all the pixels as illustrated in FIG. 15. Accordingly, in a case where the light phase modulation element 1 is the phase modulation liquid crystal panel, for example, response speed of the liquid crystal is hardly affected, thereby reducing noise at the time of switching.

It is to be noted that the unit of some objective pixels for switching the phase distribution may be a unit of one pixel or a unit of a block (a group of plurality of pixels 10). Moreover, in-plane positions of some objective pixels to be switched in the phase distribution may be at random.

1.3 Effects

As described above, according to the present embodiment, such target phase distribution data is generated that is allowed to reproduce the same reproduction image and that changes the phase distribution in the light phase modulation element 1 in a case of reproducing the same reproduction image by the light phase modulation element 1. Accordingly, it is possible to reduce burning of the pixel 10 in the light phase modulation element 1.

According to the present embodiment, the applied voltage is not fixed by changing the phase distribution and thus no pixel 10 continues to be applied with high voltage, thereby reducing burning. This makes it possible to improve and stabilize quality of the reproduction image in a case of long-term use.

It is to be noted that the effects described herein are merely examples and not limiting, and there may be other effects. The same applies to the effects of other embodiments hereinbelow.

2. Second Embodiment

Next, a phase modulator according to a second embodiment of the present disclosure is described. It is to be noted that, in the following, components similar to those of the phase modulator according to the above-described first embodiment are denoted with the same reference numerals, and descriptions thereof are omitted where appropriate.

2.1 Configuration and Operation

In the above-described first embodiment, with a main goal of reducing burning of the pixel 10 in the light phase modulation element 1, the applied voltage is changed while making it possible to reproduce the same reproduction image. Alternatively, the phase distribution of the target phase distribution may be changed to reduce occurrence of a speckle in the reproduction image in a case of using a laser light source, for example.

First Example

FIG. 17 illustrates a first example of a technique of generating target phase distribution data by the phase modulator according to a second embodiment. It is to be noted that, although the description is made herein taking an example of generating the target phase distribution data by the Gerchberg-Saxton method (GS method), the calculation method of the phase distribution may not be the GS method. Examples of the calculation method of the phase distribution includes a method of deriving the phase distribution from a diffraction approximate expression of a Fresnel region or a Fraunhofer region, and a method of deriving the phase distribution as a free-form surface lens instead of diffraction. The GS method is a method of deriving the phase distribution from the diffraction approximate expression of the Fraunhofer region, but the calculation method of the phase distribution in the present disclosure is not limited thereto.

As illustrated in FIG. 17, the phase distribution arithmetic circuit 51 may generate the target phase distribution data by the GS method as a predetermined phase distribution calculation method. The phase distribution arithmetic circuit 51 may change the phase distribution in the target phase distribution data to reduce occurrence of the speckle by temporally changing an initial phase in the GS method.

The phase distribution arithmetic circuit 51 performs an inverse Fourier transform on the target reproduction image having intensity distribution to be reproduced by providing a random initial phase as an initial condition (Step S101). Among the phase and an amplitude obtained thereby, the phase distribution arithmetic circuit 51 may replace the phase with a uniform phase (Step S102) to be used as the target phase distribution. Here, the replacement with the uniform phase is performed because the light phase modulation element 1 is assumed to perform reproduction using parallel light.

Next, the phase distribution arithmetic circuit 51 performs reproduction calculation by Fourier-transforming the phase and the amplitude obtained at Step S102 (Step S103). This allows the reproduction image to be calculated.

Next, among the phase and the amplitude obtained at Step S103, the phase distribution arithmetic circuit 51 replaces the amplitude with the amplitude of the target reproduction image (Step S104).

Next, the phase distribution arithmetic circuit 51 performs an inverse Fourier-transform on the phase and the amplitude obtained at Step S104 (Step S105), and thereafter performs a repetition operation (iteration) of repeating the calculations at Steps S102 to S105. The repetition operation may be performed until a reproduction image of a quality high enough to serve as the target reproduction image is obtained.

When attempting to reproduce the same target reproduction image over the plurality of frames or the plurality of subframes in the light phase modulation element 1, the phase distribution arithmetic circuit 51 may change the phase distribution in the target phase distribution data by temporally changing at least the random initial phase from among the above-described operations in the GS method, with respect to each frame or each subframe (Step S201).

Moreover, in a similar case, the phase distribution arithmetic circuit 51 may change the phase distribution in the target phase distribution data by temporally changing at least the number of times of the repetition operations from among the above-described operations in the GS method (Step S202).

Second Example

FIG. 18 illustrates a second example of the technique of generating the target phase distribution data by the phase modulator according to the second embodiment. In the second example, the phase distribution arithmetic circuit 51 generates the target phase distribution data in the form of a table.

The phase modulator may include a storage unit 71 that stores data of a plurality of partial phase distributions each of which makes it possible to reproduce the same reproduction image. The storage unit 71 may store the data of the plurality of partial phase distributions as the phase distribution data table, as illustrated in FIG. 18.

The phase distribution arithmetic circuit 51 may generate the target phase distribution data by combining the data of the partial phase distributions stored in the storage unit 71. The phase distribution arithmetic circuit 51 may partially change the phase distribution in the target phase distribution data by changing a combination of the data of the partial phase distributions temporally at random.

Moreover, as illustrated in FIG. 18, the phase distribution arithmetic circuit 51 may generate the target phase distribution data by dividing the target reproduction image into a plurality of divided regions and combining the data of the partial phase distributions with respect to each divided region. In this case, assuming the number of the divided regions as N and the number of pieces of data of the partial phase distributions retained as the phase distribution data table as M, for example, $M^N$ combinations of phase distributions are possible. Even when the number M of the pieces of data of the partial phase distributions is small, increasing the number of the divided regions (e.g., several thousands) makes it possible to generate substantially random phase distribution as a whole.

2.2 Effects

According to the present embodiment, it is possible to reduce occurrence of the speckle due to the light phase modulation element 1. Moreover, especially when the target phase distribution data is generated in the form of a table, it is possible to reduce calculation time and calculation cost of the target phase distribution.

Other configurations, operations, and effects may be substantially the same as those of the phase modulator according to the above-described first embodiment.

3. Third Embodiment

Next, a third embodiment of the present disclosure is described. It is to be noted that, in the following, components similar to those of the phase modulator according to the above-described first or second embodiment are denoted with the same reference numerals, and descriptions thereof are omitted where appropriate.

In the present embodiment, application examples of the light phase modulation element 1 are described.

3.1 Application Example to Projector

A projector according to the present embodiment includes a lighting system and a light intensity modulation element that generates a projection image by modulating intensity of illumination light from the lighting system. The lighting system includes a light source and a phase modulator that modulates a phase of light from the light source. The phase modulator includes the phase modulator according to the above-described first or second embodiment, which includes the light phase modulation element 1. The reproduction image generated by the light phase modulation element 1 is used as an illumination image with intensity distribution corresponding to the image to be displayed by the projector. This illumination image is used as illumination light for the light intensity modulation element.

FIG. 19 illustrates a first application example in which the light phase modulation element 1 is applied to a projector 100.

The first application example is an example configuration in a case where the light phase modulation element 1 is a reflective light phase modulation element 111.

The projector 100 includes a light source device 110, an illumination optical system 120, an image forming unit 130, and a projection optical system 140. The reflective light phase modulation element 111 is disposed between the light source device 110 and the illumination optical system 120.

The image forming unit 130 has reflective polarizing plates 31A, 31B, and 31C, reflective liquid crystal panels 32A, 32B, and 32C, and a dichroic prism 33. The reflective liquid crystal panels 32A, 32B, and 32C are light intensity modulation elements.

The light source device 110 emits light including red light, green light, and blue light. The light source device 110 includes one or more laser light sources emitting white light including red light, green light, and blue light, for example. Alternatively, the light source device 110 may include one or more of laser light sources for each color, and the one or more laser light sources for each color may emit red (R) light, green (G) light, or blur (B) light.

The reflective light phase modulation element 111 generates a desired illumination image (illumination light) by modulating the phase of light from the light source device 110. The illumination light generated by the reflective light phase modulation element 111 illuminates the reflective liquid crystal panels 32A, 32B, and 32C via the illumination optical system 120.

The illumination optical system 120 has dichroic mirrors 24A and 24B, reflective mirrors 25A and 25B, lenses 26A and 26B, a dichroic mirror 27, and polarizing plates 28A, 28B, and 28C.

The dichroic mirrors 24A and 24B selectively reflect light in a predetermined wavelength region and selectively transmit light in other wavelength regions. For example, the dichroic mirror 24A reflects mainly red light and green light in a direction of the reflective mirror 25A. Moreover, the dichroic mirror 24B reflects mainly blue light in a direction of the reflective mirror 25B. The reflective mirror 25A reflects the light (mainly red light and green light) from the dichroic mirror 24A toward the lens 26A. The reflective mirror 25B reflects the light (mainly blue light) from the dichroic mirror 24B toward the lens 26B. The lens 26A transmits the light (mainly red light and green light) from the reflective mirror 25A to be condensed on the dichroic mirror 27. The lens 26B transmits the light (mainly blue light) from the reflective mirror 25B to be condensed on the dichroic mirror 27. The dichroic mirror 27 selectively reflects green light and also selectively transmits light in other wavelength regions. The dichroic mirror 27 transmits a red light component and reflects a green light component toward the polarizing plate 28C, for example. The polarizing plates 28A, 28B, and 28C include a polarizer having a polarization axis in a predetermined direction. The polarizing plates 28A, 28B, and 28C transmit p-polarized light and reflect s-polarized light, for example.

The reflective polarizing plates 31A, 31B, and 31C respectively transmit light (e.g. p-polarized light) having the same polarization axis as that of polarized light from the polarizing plates 28A, 28B, and 28C, and reflect light (s-polarized light) having a different polarization axis. In particular, the reflective polarizing plate 31A transmits p-polarized red light from the polarizing plate 28A in a direction of the reflective liquid crystal panel 32A. The reflective polarizing plate 31B transmits p-polarized blue light from the polarizing plate 28B in a direction of the reflective liquid crystal panel 32B. The reflective polarizing plate 31C transmits p-polarized green light from the polarizing plate 28C in a direction of the reflective liquid crystal panel 32C. Furthermore, the reflective polarizing plate 31A reflects s-polarized red light from the reflective liquid crystal panel 32A to enter the dichroic prism 33. The reflective polarizing plate 31B reflects s-polarized blue light from the reflective liquid crystal panel 32B to enter the dichroic prism 33. The reflective polarizing plate 31C reflects s-polarized green light from the reflective liquid crystal panel 32C to enter the dichroic prism 33.

The reflective liquid crystal panels 32A, 32B, and 32C respectively modulate intensities of red light, blue light, or green light.

The dichroic prism 33 combines the red light, blue light, or green light of which intensities have been modulated by the reflective liquid crystal panels 32A, 32B, and 32C, and emits the combined light toward the projection optical system 140 as a projection image.

The projection optical system 140 has lenses L41, L42, L43, and L44. The projection optical system 140 magnifies the projection image generated by the image forming unit 130 and projects it to a projection surface such as a screen that is not illustrated. It is to be noted that the number of lenses and the lens configuration in the projection optical system 140 are not limited to the illustrated configuration, but may take other numbers of lenses and lens configurations. Optionally, other optical elements such as a reflective mirror and an optical filter may be included in the optical path.

FIG. 20 illustrates a second application example in which the light phase modulation element 1 is applied to the projector 100.

The second application example is an example configuration in a case where the light phase modulation element 1 is a transmissive light phase modulation element 112.

The transmissive light phase modulation element 112 is disposed between the light source device 110 and the illumination optical system 120.

Other configurations are similar to those in the first application example illustrated in FIG. 19.

3.2 Application Example to Various Optical Elements

FIG. 21 illustrates an application example in which the light phase modulation element 1 is applied to various optical elements.

As illustrated in FIG. 21, various lenses such as a convex lens, a concave lens, a lens array, a Fresnel lens, and a free-form surface lens are known as various optical elements. These lenses allow the optical path length to be changed by changing thickness of a lens material. In the light phase modulation element 1, it is possible to change the optical path length by changing a refractive index distribution in the element. This makes it possible to obtain optical characteristics equivalent to those of various lenses.

FIG. 22 illustrates an example of a blazed diffraction grating 201.

The blazed diffraction grating 201 is a diffraction grating having a serrated cross-sectional shape. The blazed diffraction grating 201 supports the following expression, when representing a diffraction pitch as pa, a diffraction angle as θ, and a wavelength of incident light as λ.

$$\sin \theta \leq \lambda/2 \, pa$$

FIG. 23 illustrates an application example in which the light phase modulation element 1 is applied to the blazed diffraction grating 201.

As also illustrated in FIGS. 1 to 3, it is possible to use the light phase modulation element 1 as the diffraction grating by changing the refractive index distribution in the element by modulating the phase of light from the light source with respect to each pixel 10. As illustrated in FIG. 25, although the pixel pitch of the light phase modulation element 1 is p, by serrating the refractive index distribution in the plurality of pixels 10, it is possible to obtain the optical characteristics equivalent to those of the blazed diffraction grating 201 having a diffraction pitch pa.

3.3 Application Example to Optical Switch

FIG. 24 illustrates an application example in which the light phase modulation element 1 is applied to an optical switch.

The optical switch includes an optical fiber 210, a diffraction grating 221, and a plurality of optical fibers 211, 212, and 213. The light phase modulation element 1 is disposed between the diffraction grating 221 and the plurality of optical fibers 211, 212, and 213. Alternatively, the light phase modulation element 1 may be further disposed in place of the diffraction grating 221.

This optical switch allows signals of different carrier wavelengths ($\lambda_1$, $\lambda_2$, $\lambda_3$) to be inputted to the optical fiber 210 and transmitted. The diffraction grating 221 separates signals, whereby the signal of each carrier wavelength transmitted by the optical fiber 210 is inputted to different position in the light phase modulation element 1 with respect to each wavelength. The signal of each carrier wavelength inputted to the light phase modulation element 1 is allocated to a desired optical fiber among the plurality of optical fibers 211, 212, and 213.

3.4 Application Example to Optical Computer

FIG. 25 illustrates an application example in which the light phase modulation element 1 is applied to an optical computer.

This optical computer includes a plurality of light phase modulation elements 1A, 1B, 1C, and 1D each including the light phase modulation element 1.

A signal A(x,y) based on a signal A is generated by modulating a phase of incident light by a light phase modulation element 1A. Next, a signal FT(A) is obtained by Fourier-transforming the signal A(x,y) using a light phase modulation element 1B. Next, a convolution signal FT(A)*FT(B) with the signal B is obtained by a light phase modulation element 1C. Next, a product A(x,y)×B(x,y) of the signal A(x,y) and the signal B(x,y) is obtained by inverse Fourier-transforming the signal FT(A)*FT(B) by a light phase modulation element 1D.

4. Other Embodiments

The technology according to the disclosure is not limited to the description of each embodiment described above, but various modifications are possible.

For example, the present technology may have the following configurations.

(1)

A phase modulator including:

a phase distribution arithmetic unit that generates, in a case of reproducing a same reproduction image over a plurality of frames or a plurality of subframes by a light phase modulation element, target phase distribution data that is allowed to reproduce the same reproduction image in at least two adjacent frames among the plurality of frames or in at least two adjacent subframes among the plurality of subframes and that changes a phase distribution in the light phase modulation element.

(2)

The phase modulator according to (1), in which the light phase modulation element has a plurality of pixels in which a phase modulation amount changes in accordance with applied voltage, and the phase distribution arithmetic unit generates the target phase distribution data that changes the phase distribution in at least some pixels among the plurality of pixels.

(3)

The phase modulator according to (2), in which the phase distribution arithmetic unit generates the target phase distribution data that changes the applied voltage to the at least some pixels among the plurality of pixels.

(4)

The phase modulator according to (3), in which the phase distribution arithmetic unit generates the target phase distribution data that averages the applied voltage to each of the pixels during a period over the plurality of frames or the plurality of subframes.

(5)

The phase modulator according to (4), in which the each of the pixels is applied with the applied voltage that periodically inverts its polarity, and the phase distribution arithmetic unit generates the target phase distribution data that averages the applied voltage to the each of the pixels during the period over the plurality of frames or the plurality of subframes with respect to each polarity.

(6)

The phase modulator according to (4), in which the phase distribution arithmetic unit generates the target phase distribution data that changes the phase distribution in some objective pixels among the plurality of pixels with respect to each of the frames or with respect to each of the subframes, and that changes the objective pixels to average the applied voltage to the each of the pixels during the period over the plurality of frames or the plurality of subframes.

(7)

The phase modulator according to (6), in which the phase distribution arithmetic unit generates the target phase distribution data in which the phase distribution of all the plurality of pixels is changed in a last frame of the plurality of frames or in a last subframe of the plurality of subframes with respect to a first frame of the plurality of frames or a first subframe of the plurality of subframes.

(8)

The phase modulator according to any one of (2) to (5), in which the phase distribution arithmetic unit generates the target phase distribution data that changes the phase distribution of all the plurality of pixels.

(9)

The phase modulator according to (1), in which the phase distribution arithmetic unit generates the target phase distribution data by a predetermined phase distribution calculation method and changes the phase distribution in the target phase distribution data by temporally changing an initial phase in the predetermined phase distribution calculation method.

(10)

The phase modulator according to (1), in which the phase distribution arithmetic unit generates the target phase distribution data by a predetermined phase distribution calculation method and changes the phase distribution in the target phase distribution data by temporally changing a number of times of repetition operations in the predetermined phase distribution calculation method.

(11)

The phase modulator according to (1) or (2), further including:

a storage unit that stores data of a plurality of partial phase distributions, the plurality of partial phase distributions being each configured to reproduce the same reproduction image, in which the phase distribution arithmetic unit generates the target phase distribution data by combining the data of the partial phase distributions and also partially changes the phase distribution in the target phase distribution data by changing a combination of the data of the partial phase distributions.

(12)

A lighting system including:

a light source;

a light phase modulation element that modulates a phase of light from the light source; and a phase distribution arithmetic unit that generates, in a case of reproducing a same reproduction image over a plurality of frames or a plurality of subframes by a light phase modulation element, target phase distribution data that is allowed to reproduce the same reproduction image in at least two adjacent frames among the plurality of frames or in at least two adjacent subframes among the plurality of subframes and that changes a phase distribution in the light phase modulation element.

(13)

A projector including:
a lighting system; and
a light intensity modulation element that generates a projection image by modulating intensity of illumination light from the lighting system, in which
the lighting system includes
a light source,
a light phase modulation element that modulates a phase of light from the light source, and
a phase distribution arithmetic unit that generates, in a case of reproducing a same reproduction image over a plurality of frames or a plurality of subframes by a light phase modulation element, target phase distribution data that is allowed to reproduce the same reproduction image in at least two adjacent frames among the plurality of frames or in at least two adjacent subframes among the plurality of subframes and that changes a phase distribution in the light phase modulation element.

This application claims the benefit of Japanese Priority Patent Application JP 2017-152624 filed with the Japanese Patent Office on Aug. 7, 2017, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A phase modulator comprising:
a phase distribution arithmetic unit configured to:
generate, in a case of a reproduction of a same reproduction image over a plurality of frames or a plurality of subframes by a light phase modulation element, target phase distribution data based on a predetermined phase distribution calculation method, wherein the target phase distribution data is allowed to reproduce the same reproduction image in at least two adjacent frames among the plurality of frames or in at least two adjacent subframes among the plurality of subframes and that changes at least some objective pixels among a plurality of pixels in the light phase modulation element to average an applied voltage to each pixel of the plurality of pixels during a period over the plurality of frames or the plurality of subframes; and
change a phase distribution in the target phase distribution data based on a temporal change in an initial phase in the predetermined phase distribution calculation method.

2. The phase modulator according to claim 1, wherein a phase modulation amount in the plurality of pixels changes in accordance with the applied voltage.

3. The phase modulator according to claim 2, wherein the phase distribution arithmetic unit is further configured to generate the target phase distribution data that changes the applied voltage to the at least some objective pixels among the plurality of pixels.

4. The phase modulator according to claim 3, wherein the phase distribution arithmetic unit is further configured to generate the target phase distribution data that averages the applied voltage to each pixel of the plurality of pixels during the period over the plurality of frames or the plurality of subframes.

5. The phase modulator according to claim 4, wherein each pixel of the plurality of pixels is applied with the applied voltage that periodically inverts corresponding polarity, and
the phase distribution arithmetic unit is further configured to generate the target phase distribution data that averages the applied voltage to each pixel of the plurality of pixels during the period over the plurality of frames or the plurality of subframes with respect to each polarity.

6. The phase modulator according to claim 1, wherein the phase distribution arithmetic unit is further configured to generate the target phase distribution data in which a phase distribution of all the plurality of pixels is changed in a last frame of the plurality of frames or in a last subframe of the plurality of subframes with respect to a first frame of the plurality of frames or a first subframe of the plurality of subframes.

7. The phase modulator according to claim 1, wherein the phase distribution arithmetic unit is further configured to generate the target phase distribution data that changes a phase distribution of all the plurality of pixels.

8. The phase modulator according to claim 1, wherein the phase distribution arithmetic unit is further configured to change the phase distribution in the target phase distribution data based on a temporal change in a number of times of repetition of a plurality of operations in the predetermined phase distribution calculation method.

9. The phase modulator according to claim 1, further comprising:
a storage unit configured to store data of a plurality of partial phase distributions, the plurality of partial phase distributions being each configured to reproduce the same reproduction image, wherein
the phase distribution arithmetic unit is further configured to (i) generate the target phase distribution data based on a division of the same reproduction image into a plurality of divided regions and a combination of the data of the plurality of partial phase distributions with respect to each divided region of the plurality of divided regions, and (ii) partially change the phase distribution in the target phase distribution data based on a change in the combination of the data of the plurality of partial phase distributions.

10. A lighting system comprising:
a light source;
a light phase modulation element configured to modulate a phase of light from the light source; and
a phase distribution arithmetic unit configured to:
generate, in a case of a reproduction of a same reproduction image over a plurality of frames or a plurality of subframes by the light phase modulation element, target phase distribution data based on a predetermined phase distribution calculation method, wherein the target phase distribution data is allowed to reproduce the same reproduction image in at least two adjacent frames among the plurality of frames or in at least two adjacent subframes among the plurality of subframes and that (i) changes a phase distribution in the light phase modulation element, and (ii) changes at least some objective pixels among a plurality of pixels in the light phase modulation element to average an applied voltage to each pixel of the plurality of pixels during a period over the plurality of frames or the plurality of subframes; and change a phase distribution in the target phase distribution data based on a temporal change in an initial phase in the predetermined phase distribution calculation method.

11. A projector comprising:
a lighting system; and
a light intensity modulation element configured to generate a projection image based on a modulation of intensity of illumination light from the lighting system, wherein
the lighting system includes
a light source;
a light phase modulation element configured to modulate a phase of light from the light source, and
a phase distribution arithmetic unit configured to:
generate, in a case of a reproduction of a same reproduction image over a plurality of frames or a plurality of subframes by the light phase modulation element, target phase distribution data based on a predetermined phase distribution calculation method, wherein the target phase distribution data is allowed to reproduce the same reproduction image in at least two adjacent frames among the plurality of frames or in at least two adjacent subframes among the plurality of subframes and that (i) changes a phase distribution in the light phase modulation element, and (ii) changes at least some objective pixels among a plurality of pixels in the light phase modulation element to average an applied voltage to each pixel of the plurality of pixels during a period over the plurality of frames or the plurality of subframes; and change a phase distribution in the target phase distribution data based on a temporal change in an initial phase in the predetermined phase distribution calculation method.

12. A phase modulator comprising:
a phase distribution arithmetic unit configured to:
generate, in a case of a reproduction of a same reproduction image over a plurality of frames or a plurality of subframes by a light phase modulation element, target phase distribution data based on a predetermined phase distribution calculation method, wherein the target phase distribution data is allowed to reproduce the same reproduction image in at least two adjacent frames among the plurality of frames or in at least two adjacent subframes among the plurality of subframes and that (i) changes a phase distribution in the light phase modulation element, and (ii) changes at least some objective pixels among a plurality of pixels in the light phase modulation element to average an applied voltage to each pixel of the plurality of pixels during a period over the plurality of frames or the plurality of subframes; and change a phase distribution in the target phase distribution data based on a temporal change in a number of times of repetition of a plurality of operations in the predetermined phase distribution calculation method.

\* \* \* \* \*